(12) United States Patent
Denoue et al.

(10) Patent No.: US 7,836,409 B2
(45) Date of Patent: Nov. 16, 2010

(54) SYSTEMS AND METHODS FOR USING INTERACTION INFORMATION TO DEFORM REPRESENTATIONS OF DIGITAL CONTENT

(75) Inventors: Laurent Denoue, Palo Alto, CA (US);
Patrick Chiu, Menlo Park, CA (US);
Tohru Fuse, Santa Clara, CA (US);
Jonathan Trevor, Santa Clara, CA (US);
David M. Hilbert, San Jose, CA (US);
Les Nelson, Santa Clara, CA (US);
Elizabeth F. Churchill, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1577 days.

(21) Appl. No.: 10/672,980

(22) Filed: Sep. 26, 2003

(65) Prior Publication Data

US 2005/0071864 A1 Mar. 31, 2005

(51) Int. Cl.
*G06F 3/048* (2006.01)
(52) U.S. Cl. .................. 715/789; 715/800; 715/811; 715/815
(58) Field of Classification Search ............. 715/866, 715/788–789, 811, 815, 800–801; 725/9, 725/14, 135
See application file for complete search history.

(56) References Cited

U.S. PATENT DOCUMENTS

| | | | |
|---|---|---|---|
| 5,821,926 A | 10/1998 | Arita | |
| 6,624,846 B1 | 9/2003 | Lassiter | .................. 348/211.4 |
| 6,768,497 B2 | 7/2004 | Baar | |
| 6,771,302 B1 | 8/2004 | Nimri | |
| 7,058,940 B2 * | 6/2006 | Calahan | ...................... 717/167 |
| 2004/0008635 A1 * | 1/2004 | Nelson et al. | ............... 370/260 |
| 2004/0169683 A1 * | 9/2004 | Chiu et al. | .................. 345/776 |
| 2005/0033657 A1 * | 2/2005 | Herrington et al. | ............ 705/26 |

FOREIGN PATENT DOCUMENTS

| | | |
|---|---|---|
| EP | 0727734 A1 | 8/1996 |
| EP | 0994430 A2 | 4/2000 |
| JP | 05-61632 | 3/1993 |
| JP | 08-129469 | 5/1996 |
| JP | 2000-66803 | 3/2000 |
| JP | WO 02/27574 A1 | 4/2002 |

OTHER PUBLICATIONS

Adaptive Direct Manipulation, R. Douglas Riecken, IEEE, 1991, pp. 1115-1120. vol. 2.*

(Continued)

*Primary Examiner*—William L Bashore
*Assistant Examiner*—Andrew Tank
(74) *Attorney, Agent, or Firm*—Fliesler Meyer LLP

(57) ABSTRACT

User behavior while interacting with one or more first representations of digital content can be monitored. Interaction information can be determined by monitoring the user behavior while interacting. Interaction information can include information identifying interaction areas of the first representation, degree of interaction information, and sequence of interaction information. The interaction information can be maintained and used to deform a second representation of digital content. The first and second representations can be of the same or different digital content.

39 Claims, 14 Drawing Sheets

OTHER PUBLICATIONS

The Task Gallery A 3d Window Manager, Robertson et al., CHI 2000, Apr. 1-6, 2000.*

WebThumb: Interaction Techniques for Small-Screen Browser, Wobbrock et al., 2002, Paris, France.*

Bederson, Benjamin B., et al., "Jazz: An Extensible Zoomable User Interface Graphics Toolkit in Java," Proceedings of the 13$^{th}$ Annual ACM Symposium on User Interface Software and Technoloogy, CHI Letters, vol. 2, No. 2, Nov. 2000, pp. 171-180.

Bickmore, T.W., et al., "Digestor: device-independent access to the World Wide Web," Computer Networks and ISDN Systems, vol. 29, pp. 1075-1082, Sep. 1997, also appears in Proceedings for the Sixth International World Wide Web Conference, Apr. 7-11, 1997, pp. 655-663.

Carr, Leslie, et al., "Writing and Reading Hypermedia on the Web," Technical Report No. ECSTR-IAM00-1, University of Southampton, UK, Feb. 2000, http://www.bib.ecs.soton.ac.uk/data/3368/html/WRWH.html, pp. 1-13.

Chang, Bay-Wei, et al., "Fluidly Revealing Information in Fluid Documents," AAAI Smart Graphics Spring Symposium, Stanford University, 2000, pp. 178-181.

Hightower, R.R., et al., "Graphical Multiscale Web Histories: A Study of PadPrints," ACM Conference on Hypertext and Hypermedia, Jun. 1998, pp. 58-65.

Hill, W.C., et al., "Edit Wear and Read Wear," CHI'92, May 1992, pp. 3-9.

Myers, Brad A., et al., "Interacting at a Distance Using Semantic Snarfing," ACM UbiComp 2001: Ubiquitous Computing, Atlanta, Georgia, Sep. 30-Oct. 2, 2001, pp. 305-314.

Myers, Brad A., "Using Handhelds and PCs Together," Communications of the ACM, vol. 44, Issue 11, Nov. 2001, pp. 34-41.

Robertson, George, et al., "The Task Gallery: A 3D Window Manager," CHI2000, CHI Letters, vol. 2, Issue 1, Apr. 2000, pp. 494-501.

Wobbrock, Jacob O., et al., "WebThumb: Interaction Techniques for Small-Screen Browsers," UIST'02, Oct. 27-30, 2002, pp. 205-208.

Woodruff, A., et al., "Using Thumbnails to Search the Web," CHI2001, Conference on Human Factors in Computing Systems, Mar. 31-Apr. 5, 2001 pp. 198-205.

International Search Report dated Dec. 12, 2000, Application No. PCT/JP00/06571, 25 pages.

Office Action dated Jan. 12, 2010, Application No. JP2004-266681, 3 pages including translation.

Björk, Staffan, et al., "West: A Web Browser for Small Terminals," ACM Symposium on User Interface Software and Technology, Nov. 1999, Association for Computing Machinery, CHI Letters, V1, No. 1, pp. 187-196.

Holmquist, L.E., et al., "Flip Zooming: A Practical Focus+Context Approach to Visualizing Large Data Sets," 1997, Elsevier, vol. 2, pp. 763-766.

* cited by examiner

SYSTEMS AND METHODS FOR USING INTERACTION INFORMATION TO DEFORM REPRESENTATIONS OF DIGITAL CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following applications are cross-referenced and incorporated herein by reference:

U.S. patent application Ser. No. 10/125,346, entitled SYSTEMS AND METHODS FOR DISPLAYING TEXT RECOMMENDATIONS DURING COLLABORATIVE NOTE TAKING, by Laurent Denoue, et al., filed Apr. 19, 2002, which issued as U.S. Pat. No. 7,680,820 Mar. 16, 2010.

U.S. patent application Ser. No. 10/617,549, entitled TELEPRESENCE SYSTEM AND METHOD FOR VIDEO TELECONFERENCING, by Jonathan T. Foote, et al., filed Jul. 11, 2003, which issued as U.S. Pat. No. 7,154,526 Dec. 26, 2006.

U.S. patent application Ser. No. 10/629,403, entitled VIDEO ENABLED TELE-PRESENCE CONTROL HOST, by Qiong Liu, et al., filed Jul. 28, 2003.

FIELD OF THE DISCLOSURE

The present disclosure relates generally to systems and methods for rendering representations of digital content and more specifically to systems and methods for monitoring past and current user interaction with representations of digital content to improve the presentation of and interaction with representations of digital content.

BACKGROUND

Digital content is steadily becoming more ubiquitous in today's modern computing environment. Consequently, users are more consistently and frequently accessing digital content. As users access digital content more and more, the presentation of and ease with which digital content can be accessed and interacted with is becoming more important.

In many instances, users may find themselves using and interacting with representations of digital content that are similar but different to other representations of digital content. For example, many users access digital content, such as software applications, web pages, documents, etc. at work using a desktop computing device and at home using a laptop, PDA, and/or cellphone. In a simple example, a user may interact with a representation of digital content that is merely of a different size than a previously used representation of the digital content. Consequently, users may interact with different representations of the same digital content.

A user may get confused, disoriented, or otherwise have trouble when interacting with a representation of digital content that is somehow different than a previous representation of the same content with which she interacted. For example, a user may have trouble selecting and interacting with representations that have been scaled for presentation with a PDA. Pixel coordinates may be scaled-down such that selectable areas of the representation become harder to select.

In many instances, the problem can be amplified by other factors such as the use of a stylus or fingers on a touch-screen. Scaled representations are often accessed or interacted with using non-traditional or less accurate input devices such as styluses or touch-screens. Scaled representations can further be more difficult to understand, especially when the representation includes text-based regions. Scaled-down representations such as those on touch screens can be more difficult to interact with because a user does not know what can be selected in many cases. Unlike a mouse or similar input device, touch screens typically do not have cursors that can change shape or otherwise provide feedback to indicate a selectable area.

Users may also find themselves accessing content that is similar to other content, yet not exactly the same. For example, users may access different web pages having similar layouts or features, such as text boxes including search fields, submit buttons, and portlets such as news headline portlets. Moreover, users may begin use of new software applications having interfaces with a similar layout or functionality to other interfaces.

Users may get confused or disoriented when interacting with a representation of new digital content, such as an interface of a new software application or a new digital image. Users may have trouble determining where selectable features such as menu items are located.

DETAILED DESCRIPTION

Figure 1:
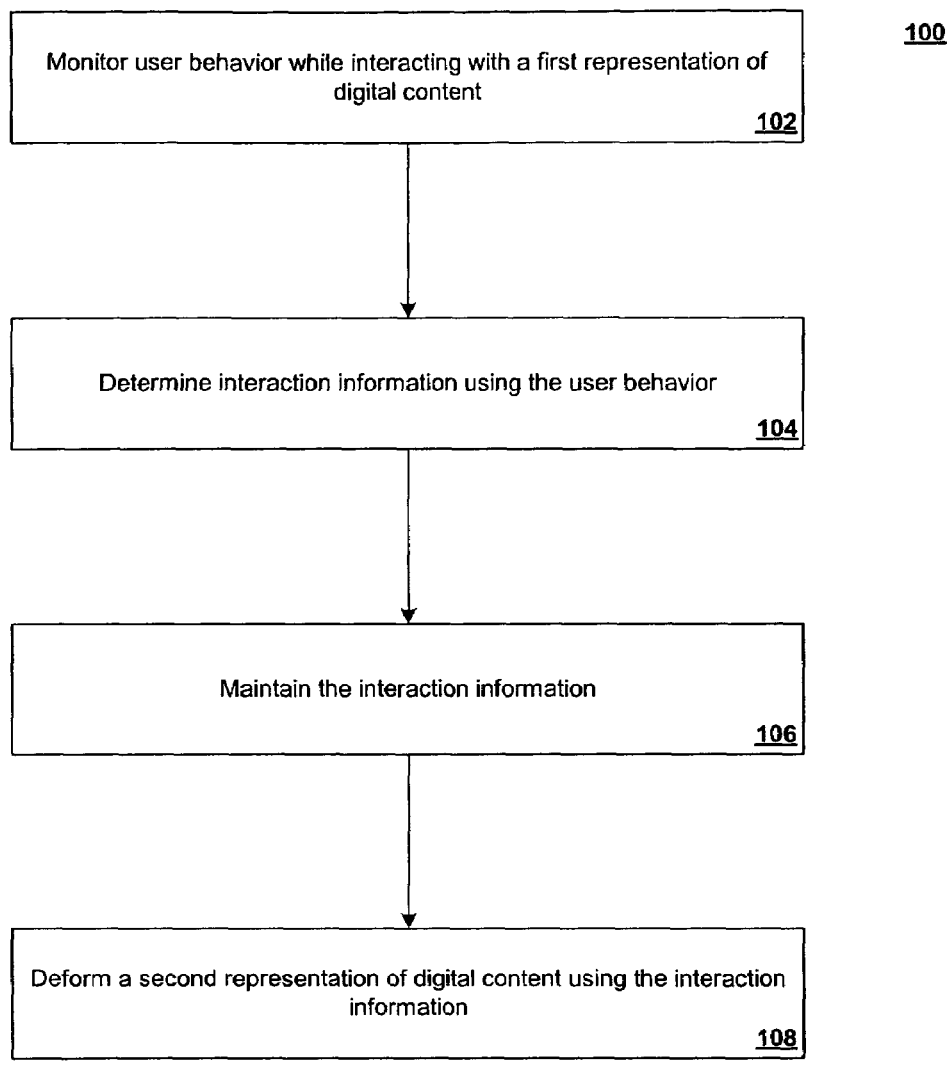
FIG. 1 is a flowchart illustrating a method in accordance with an embodiment for deforming a representation of digital content using past and current user interaction.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical, optical, and/or biological components of a processor and its subsystems.

Various operations will be described as multiple discrete steps in turn, in a manner that is most helpful in understanding the present invention, however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

Systems and methods in accordance with embodiments of the present invention can provide for improved presentation and interaction with digital content and representations of digital content. Representation as used herein includes, but is not limited to any visual and/or audible presentation of digital content. By way of a non-limiting example, digital images, web pages, digital documents, digital audio, and other suitable content can have corresponding representations of their underlying content. Moreover, interfaces such as graphical user interfaces (GUI's) can have corresponding representations of their underlying content.

In one embodiment of the present invention, past and current user interaction with a first representation of digital content can be used to improve presentation and interaction with a second representation of the same digital content or of other digital content. For example, user interaction with a representation of an interface or web page can be used to improve the presentation and interaction with a scaled representation of the interface or web page. In one embodiment, user interaction can be used to deform the layout and/or active areas of a representation of digital content. User interaction with a representation such as that of an interface or digital document can also be used to improve presentation and interaction with the same representation. In other embodiments, user interaction with a representation of first digital content such as a first web page can be used to improve a representation of second digital content such as a second web page.

FIG. 1 is a flowchart for using user behavior while interacting with a first representation to deform a second representation in accordance with one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In one embodiment, the first representation and the second representation can be the same representation. In another embodiment, the second representation can be a scaled version of the first representation. In yet another embodiment, the first representation can be of first digital content while the second representation can be of second digital content.

At step 102, user behavior while interacting with a first representation can be monitored. Monitoring user behavior while interacting with the first representation can include determining areas of the representation with which one or multiple users interact. Determining areas of the representation with which a user interacts, such as by providing input at an area or indicating a selection of an area, can include determining areas corresponding to input received from a user. For example, an area of the representation that a user clicks or selects can be determined. A selected hotspot, a highlighted textual passage, a selected menu item or button can all be determined as part of step 102.

Any device or method for providing input can be used in accordance with embodiments of the present invention. For example, monitoring user behavior while interacting can include monitoring mouse clicks, keyboard selections, voice commands, gestures, remote control inputs, PDA inputs as well as any other suitable input. An application or software component such as a monitoring component can be configured to accept information relating to input. By way of a non-limiting example, a component can be configured to be notified of input such as mouse clicks. An event or an object generated by the input can be accessed to determine information such as the location and type of the input.

Monitoring user behavior can include monitoring a single user's behavior or multiple users' behaviors. User behavior can also be monitored over periods of time. For example, user interaction with a representation over multiple instances or periods of time can be observed. The information can be used to determine user behavior based upon the observed extended interaction period or instances. In one embodiment, the user behavior of a first user while interacting with a representation of digital content can be used to deform a representation of digital content presented to a second user.

Interaction information can be determined using the user behavior at step 104. In one embodiment, determining interaction information includes determining identification information for areas interacted with or determined to be of interest to a user. For example, the pixel coordinates of a point or area of interaction can be determined, an identifier for a menu item of an interface can be determined, or a destination universal resource locator (URL) corresponding to a selected hyperlink can be determined as part of determining interaction information. Furthermore, information identifying degrees or sequences of interaction with areas or sets of areas of the first representation can be determined. In one embodiment, determining interaction information includes aggregating, averaging, or otherwise combining multiple users' interactions. Furthermore, determining interaction information can include aggregating, averaging, or otherwise combining multiple instances of a single user's interaction with a first representation.

At step 106, interaction information can be maintained. In one embodiment, maintaining interaction information can include logging or storing information relating to interaction. For example, information identifying areas interacted with or determined to be of interest using observed user interaction can be stored. As discussed below, numerous systems and techniques can be used to maintain interaction information.

A second representation can be deformed at step 108 based on the behavior monitored at step 102. Various techniques for deforming the second representation can be used in accordance with embodiments of the present invention as discussed below.

Figure 2:
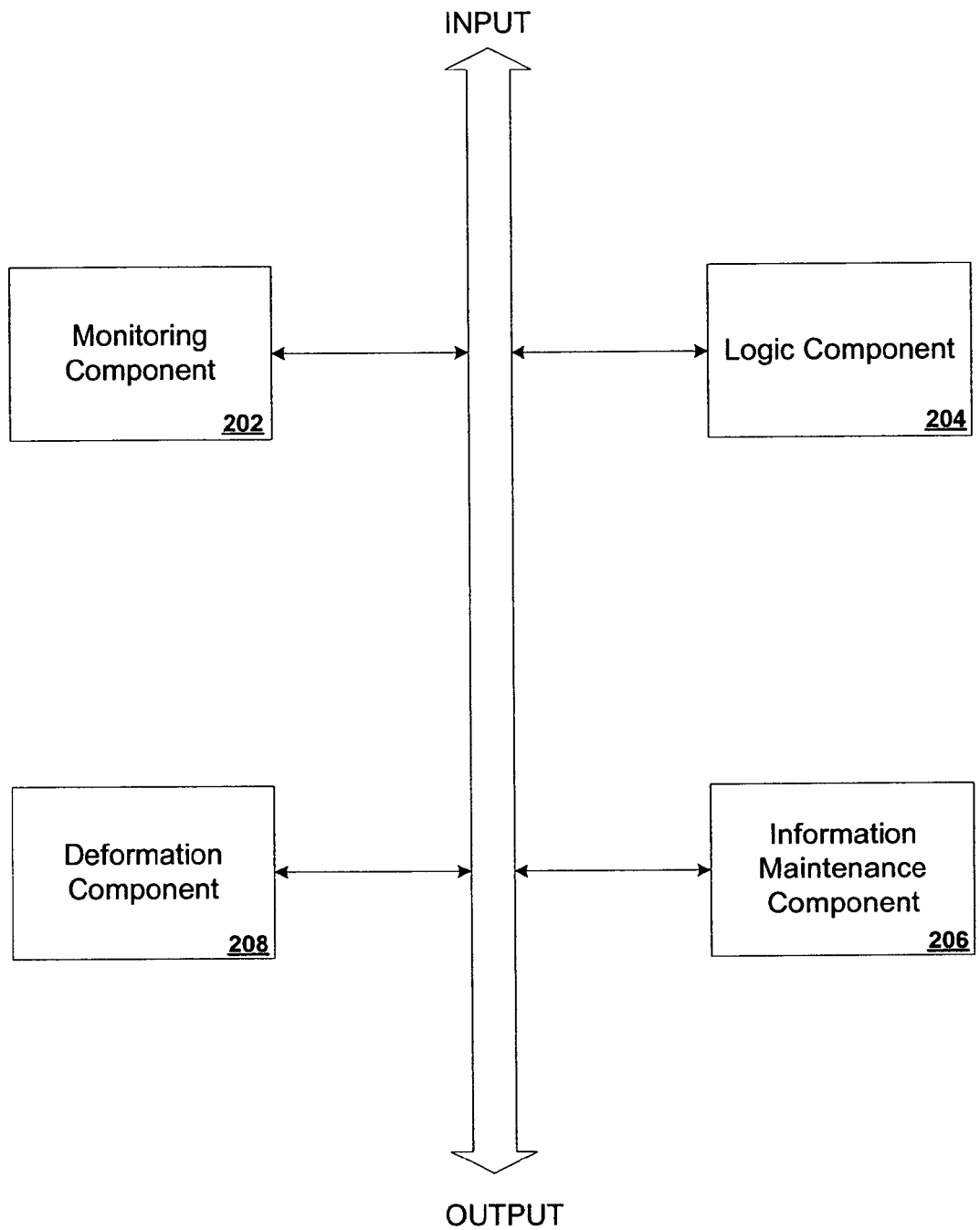
FIG. 2 is a system in accordance with an embodiment that can be used to implement the flowchart of FIG. 1.

FIG. 2 is a system 200 in accordance with an embodiment that can be used to implement the flowchart of FIG. 1. Although this diagram depicts objects/processes as logically separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

Monitoring component 202 can monitor user behavior while interacting with one or more representations of digital content. As part of monitoring user interaction with a first representation, component 202 can receive input corresponding to areas of the representation with which a user's interacts. For example, monitoring component 202 can receive input identifying an area of the representation that a user selects or to which a user otherwise provides input. Such input can include "highlighting" a textual passage of content, selecting a portion of an image or document (e.g., "clicking and dragging" with an input device to identify or select an area), and selection of thumbnails, hyperlinks, or hotspots, and other selectable areas. In some embodiments, monitoring component 202 can monitor how often or how many times an area(s) is interacted with or in what order a user interacts with areas.

In one embodiment, monitoring component 202 can monitor the selection of active areas of a representation. Active areas can include any geographic region of a representation of content adapted to receive user input and/or provide an action in response to user input. By way of a non-limiting example, hyperlinks, hotspots, areas for receiving data such as textual data supplied by a user, and areas that otherwise have actions associated with selection of the area all have corresponding active areas. Menu items or buttons of an interface or of content such as web pages, documents, etc. can have corresponding active areas. By way of a further non-limiting example, a representation of a GUI for a software application may have an active area corresponding to menu items, buttons, data entry fields, etc. Menu items of an interface can include any area that can be selected to invoke, edit, or utilize the interface and the underlying application including its features, functions, attributes, options, or commands.

Various techniques can be used in accordance with embodiments to monitor user behavior while interacting with representations of digital content. It will be appreciated by one of ordinary skill in the relevant arts that any of such techniques can be used and are within the scope of the present disclosure. By way of a non-limiting example, monitoring component 202 can monitor all or some input received by a device or application. Monitoring can include determining that input has been provided or received as well as determining the type of input. In one embodiment, monitoring component 202 can access a device driver or application programming interface (API). For example, an input device event such as a mouse click can be determined by accessing a device driver or API. Monitoring component 202 can monitor such events to determine that an interaction has occurred as well as what type of interaction has occurred and where the interaction has occurred. In one embodiment, component 202 is configured to be notified of input such as events.

Logic component 204 can determine information and perform various functions and/or steps in accordance with the flowchart of FIG. 1. For example, logic component 204 can be used to determine interaction information using user behavior at step 104 of FIG. 1. Logic component 204 can further determine information and perform various functions and/or steps not shown in FIG. 1. Logic component 204 can determine interaction areas from the user behavior monitored by component 202 in one embodiment.

An interaction area can include any geographic region of a representation with which a user interacts. Input received from a user can be used to determine and/or define an interaction area. In one embodiment for example, monitoring component determines that a user has provided input to a representation. Logic component 204 can accept the information and determine an area corresponding to the received input. By way of a non-limiting example, logic component 204 can receive or retrieve an event generated by an input device driver and determine a region of a representation corresponding to the event.

In a simple non-limiting example, logic component 204 can determine a pixel coordinate(s) corresponding to a region to which a user has provided input. Information identifying an interaction area can include an x,y coordinate corresponding to an interaction area. In other examples, two x,y coordinates such as two points identifying two corners of a rectangle can be used to identify an interaction area or a coordinate and radius can be used to identify a circular interaction area. A user may "click and drag" to identify an area of a representation. An area defined by the user's input can be determined and identified using coordinates corresponding to the received input. Any scheme or technique known in the art for identifying an area can be used in accordance with embodiments of the present invention.

In one embodiment, an API of a software application can be accessed to determine an interaction area. For example, in many slide show presentation software applications, textual, image, and other areas in content presented through the interface are defined by boundaries such as text box boundaries. By accessing an API, a selection within these boundaries can be determined. From the selection, a textual or other region corresponding to the selection can be determined to be an interaction area.

In one embodiment, logic component 204 can extrapolate input to determine an interaction area. For example, logic component can receive an event indicating a single click within a textual passage. The single click can correspond to and be represented by a single pixel coordinate within the text passage. Logic component 204 can receive the event and use the information to extrapolate and determine an interaction area corresponding to the entire textual passage. For example, logic component can determine two or more pixel coordinates defining a region corresponding to the textual passage.

Additionally, receiving input at a location near an area can be used to determine that an area is an interaction area. This can be useful in situations where the interactions of multiple users or a single user over a period of time are being monitored. The user(s) may not select the exact same area even though their interest is all in the same area. In this embodiment, selections near an area can be used to determine that an area is an interaction area.

Active areas can also be determined to be interaction areas. In one embodiment, user input received at or near an active area can be used to determine that an active area is an interaction area. For example, user selection of a hotspot or hyperlink can be used to determine that the active area corresponding to the hyperlink or hotspot is an interaction area.

Logic component 204 can additionally determine unique identifiers corresponding to menu items, buttons, and other similar active areas of an interface or other content with which a user interacts. In one embodiment for example, an API can be accessed to determine that an active area corresponding to a menu item has been selected. A unique identifier such as a variable name for the menu item can then be determined. A unique identifier can be tracked to determine a corresponding active area of a second representation.

Unique identifiers can also be useful where interactions with a representation of a first web page are used to deform a representation of a second web page. For example, a "submit" button or field for entry of a username in a representation of a web page such as that illustrated in FIG. 5 may be determined to be an interaction area. An identification of the interaction area can be determined by accessing an API for an internet browser to determine the area of the page selected. After determining the area selected, a document file (e.g., an html file) for the web page can be accessed to determine a unique identification for the area. For example, a text entry field of a web page may be represented by an identification such as 'username.input' in an html document. The identification from the html document can be tracked.

Logic component 204 can further determine a destination universal resource locator (URL) to identify an interaction area corresponding to a hyperlink. For example, an API for an internet browser can be accessed to determine links selected by a user. By accessing the API, the destination URL address of a hyperlink can be determined. In one embodiment, the URL can be maintained with an identification of the web page containing the hyperlink.

In one embodiment, logic component 204 can determine an image corresponding to an interaction area as part of determining interaction information. By way of a non-limiting example, an area corresponding to a "close" menu item of a first representation of an interface may be determined to be an interaction area. The menu item may be represented by a graphic such as an 'X' as is show in FIG. 9. Monitoring component 202 can determine that input has been received or provided at an area corresponding to the menu item. Logic component can then determine a graphic corresponding to the menu item. Logic component 204 may access an API in order to determine the graphic or file containing information for the graphic. Images can be tracked for later use in deforming a second representation. An image comparison of the tracked graphic can be made with the graphics of a second representation. A matching graphic can be determined to be a corresponding interaction area and deformed accordingly. Image comparison can be applied to determine corresponding areas between any two images. For example, a person's face may be determined to be an interaction area. The face can be tracked and compared to determine a matching face in subsequent images. In this manner, interaction information with a first image can be used to deform a representation of a second image.

It will be understood by those of ordinary skill in the art that other information identifying interaction areas can be used in accordance with embodiments of the present invention. Additionally, other techniques can be used to identify some of the types of interaction areas discussed herein. For example, the active area corresponding to a hyperlink could be identified by pixel coordinates as has been discussed. Similarly, coordinates can be used to identify interaction areas corresponding to menu items, etc.

In accordance with one embodiment, logic component 204 can include a degree evaluation component and a sequence evaluation component (not shown). The evaluation components can evaluate user behavior while interacting with interaction areas as well as evaluate the interaction areas themselves. In one embodiment, evaluation component 206 can evaluate interaction information in conjunction with determining interaction information at step 104 of FIG. 1. These evaluation components can evaluate interaction to determine degrees of interaction with interaction areas and to determine a sequence of interaction with interaction areas. An aggregated, averaged, or otherwise combined interaction of multiple users or single users over multiple instances can be used to evaluate user interaction.

In accordance with an embodiment, a degree evaluation component can evaluate how often or many times an interaction area is selected. The evaluation can be used at step 104 to determine interaction information identifying degrees of interaction with interaction areas. For example, the number of times one or more users select an interaction area can be determined from an evaluation of user interaction. Information identifying the user interaction can be determined and stored along with an identification of the interaction area. In another embodiment, a relative degree of interaction with interaction areas can be determined from an evaluation of user interaction. The number of times an interaction area is selected in relation to other interaction areas can be determined. Information identifying a relative interaction can be tracked and used in deformation. An evaluation of user interaction can also be used to determine that some areas should not be tracked at all. For example, an area selected once may be determined to not be of sufficient interest to warrant tracking.

A sequence evaluation component can evaluate user interaction to determine a sequence by which one or more users interact with a representation. User interaction can be evaluated to determine a sequence of interaction with interaction areas in one embodiment. The evaluation can be used at step 104 to determine interaction information identifying a sequence of interaction with interaction areas. Various information identifying a sequence of interaction can be used in accordance with various embodiments. For example, the order in which one or more users select interaction areas can be determined. In one embodiment, the interactions of multiple users can be aggregated, weighted, averaged, and/or otherwise combined to determine sequence information. Information identifying a sequence of interaction can be very useful when deforming a representation of a second interface by applying an animation sequence to interaction areas.

Information maintenance component 208 can maintain interaction information. In one embodiment, maintenance component maintains information determined at step 104 of FIG. 1. In one embodiment, a file or storage unit can be used to maintain the information. By way of non-limiting example, interaction information can be stored or maintained in a cache memory or a more permanent memory. Furthermore, interaction information can be stored or maintained by a client, server, or proxy depending on a particular application and/or the applications desired functionality.

Information relating to user interaction can be stored for use in deforming representations of digital content. In a simple example, an identification of interaction areas of a first representation can be stored for later use in deforming a second representation. Additionally, information relating to a degree of interaction with an interaction area can be stored. For example, a number of times an area was interacted with or a percentage of interaction with an interaction area relative to other interaction areas of a representation can be stored. Furthermore, information relating to a sequence of interaction with interaction areas can be stored. The information in the file can be accessed and used to deform a representation of digital content when presented.

In some embodiments, maintenance component 206 can maintain information relating to how a representation of an interface or other digital content is to be deformed. This deformation information can be maintained along with interaction information. For example, an identification of an interaction area can be stored with information relating to how to deform the interaction area. The information may specify that an area is to be enlarged or zoomed, an active area expanded, an animation to be applied to the area, etc.

In one embodiment of the present invention, interaction information is maintained along with an identification of the digital content to which the interaction information relates. For example, a file can include information identifying an interface, an identification of interaction areas of the interface, information relating to the degree of interaction with each interaction area, and information identifying a sequence of interaction with the interaction areas.

Consider an example wherein interaction information with a web page is tracked. A file used to maintain the interaction information may include information identifying the web page (such as its URL address), information identifying interaction areas of the web page (such as the URL address or pixel coordinates corresponding to hyperlinks followed from the web page), information identifying the order in which the interaction areas were selected or are most commonly selected, and information identifying the number of times each interaction area was interacted with.

A file or other storage unit that is used to maintain interaction information can include information for more than one representation of digital content. For example, one file may include identifications of numerous interfaces and other content such as web pages and documents along with interaction information for each of the interfaces and content.

In one embodiment, interaction information can be added to or embedded within other information for digital content. By way of non-limiting examples, interaction information can be appended to, combined with, or imbedded within a digital document file (such as a .txt file, e.g.), a web page file (such as an .html or jsp file), or a file for a software application. The interaction information can be accessed to deform a representation of the digital content when rendered.

Deformation component 208 can be used to deform a second representation of digital content. In one embodiment, deformation component 208 can be used to deform a second representation of digital content at step 108 of FIG. 1. Deformation component 208 can deform representations of digital content through a dedicated interface as well as deform representations of digital content rendered or to be rendered by other applications. For example, a representation of a digital document presented through a GUI of a word processing application can be deformed.

It will be understood that numerous software applications and content presented with such applications can benefit from various embodiments. For example, and without limitation, internet browsers, media players/editors, word processing applications, slide presentation/creation applications, e-book readers, and operating system user interfaces can all benefit from embodiments. In one embodiment, software can be incorporated within any such application. It will be understood that one or more components can be added to an application. For example, an application may include a deformation component adapted to receive interaction information. For example, code may be added to the underlying code for the application to improve the application. In other embodiments, a separate application can run "alongside" other applications for improvement of the application.

In one embodiment for example, an application in accordance with an embodiment is implemented as a stand-alone application. A stand alone application may be implemented with a dedicated user interface for presenting, editing, and/or deforming representations such as web pages, documents, slides, etc.

In another embodiment, a background application can be implemented to improve presentation and interaction with representations of web pages, documents, images, etc. presented through third-party interfaces as well as the presentation and interaction with third-party interfaces themselves. A background application can monitor user behavior while interacting with multiple representations including those of interfaces and other digital content to improve presentation and interaction with other representations of the same or other digital content.

In a background application implementation, user behavior while interacting with various content and applications can seamlessly be tracked to improve the presentation of software application interfaces and content presented through the interfaces. An application can monitor behavior, maintain interaction information, and apply deformations to representations of content and interfaces without user intervention and without interfering with the user's typical interaction with the interface or content.

Embodiments in accordance with the present invention can be implemented as client side applications, server side applications, proxy applications, or various combinations thereof. Accordingly, the components of FIG. 2 and steps of FIG. 1 can be distributed and/or implemented in any combination on a client-side device, a server, or a proxy server depending on the desired functionality of a particular application. All such combinations are considered within the scope of the present disclosure.

For example, user behavior while interacting with a first representation can be monitored by a monitoring component installed at a server, client, or proxy. Likewise, interaction information can be determined by a logic component and maintained by a maintenance component that is installed at a server, client, or proxy. Moreover, a second representation can be deformed by a deformation component implemented at a server, client, or proxy. Additionally, in some embodiments, instances or copies of a component can be implemented at multiple locations.

In a simple embodiment for example, monitoring component 202 can be implemented on a client device to monitor user behavior while interacting with representations of interfaces and content presented on the client device. Logic component 204 can determine interaction information and maintenance component 206 can track the information at the client device. If a second representation is to be deformed for presentation on the client device using the interaction information, a deformation component 208 on the client device can deform the second representation. If a second representation is to be deformed for presentation on a second device using the interaction information, the interaction information can be accepted at the second device where a deformation component 208 can deform the second representation. In various embodiments, the deformation component can deform a representation using various techniques. A deformation component on a client device may access a document object model to deform corresponding interaction areas without modifying the original content.

Other embodiments in accordance with the present invention can be implemented as server-side applications. User interaction with multiple devices in communication with the server can be used to determine interaction information. The information can be tracked at the server so that it can be used to deform representations presented on any machine in communication with the server. In one embodiment, a server-side deformation component can modify original content before it is transmitted.

Further embodiments can be implemented as proxy server based applications. A proxy server can interface between a client and server to handle transfers of information including content, events, commands, instructions, etc. For example, in a web-based context, a proxy server can handle requests and transfers among client based applications such as Web browsers and server side applications such as Web servers.

In a proxy server based embodiment, interaction with representations of interfaces and content by one or more users can be maintained and used to deform representations of content passed through the proxy server. In one proxy based embodiment, monitoring component 202 can be implemented at a client (such as on a PDA, PC, etc.). Monitoring component 202 can monitor user interaction with representations of content presented on the client device. Logic component 204 can be implemented at the client and can determine interaction information based upon the monitored user interaction. The interaction information can be transferred to the proxy server using any system or technique as known in the art.

In another embodiment, monitoring component 202 and logic component 204 can be implemented at the proxy server. By way of a non-limiting example, an object corresponding to a selection within a representation of a Web page containing Java script can be transferred to and/or through the proxy server. Monitoring component 202 can further monitor the selection of hyperlinks and other active areas within the representation. Monitoring component 202 can monitor messages including the transmission of objects and events corresponding to selections in order to monitor user interaction. Logic component 204 can use the received information to determine interaction information such as area corresponding to the selection. In various proxy based embodiments, monitoring and logic components can be implemented at a client and/or proxy.

Information maintenance component 206 can be implemented at the proxy server. In one embodiment, the maintenance component can be implemented as one or more files containing interaction information. In further embodiments, the maintenance can be maintained at any location including at a third party. Deformation and logic components can accept and/or retrieve information from the maintenance component at the third party. In one embodiment, a proxy or third party implementation of the information maintenance component can be used to deform a representation of content for a second user using interaction information of a first user. For example, interaction information of a first user can be maintained at a proxy, server, or on a network. A representation of content accessed by a second user through the proxy, server, or network can be deformed using the interaction information of the first user.

In one embodiment, deformation component 208 is implemented at the proxy. At the proxy server, interaction information can be used in the deformation of representations of interfaces and content accessed through the proxy server. For example, a user may request a web page using a web browser or other client based application. The proxy can retrieve the web page from a Web server (or locally if cached, e.g.). Deformation component 208 can use interaction information maintained by maintenance component 206 to deform a representation of the requested web page before it is sent to the user. In one embodiment, a data file such as an .html document and/or Java script code corresponding to the web page can be modified prior to sending the file to the user. Deformation component 208 can use previously determined interaction information with the requested web page or with other web pages or similar content. In one embodiment, a proxy based application can deform a representation of an interface or content based on a type of device receiving the content.

In another embodiment, deformation component 208 can be implemented at the client device. Interaction information can be transferred to the requesting client along with data for the requested web page. The deformation component can deform a representation of the web page before presentation on the client device.

Figure 3:
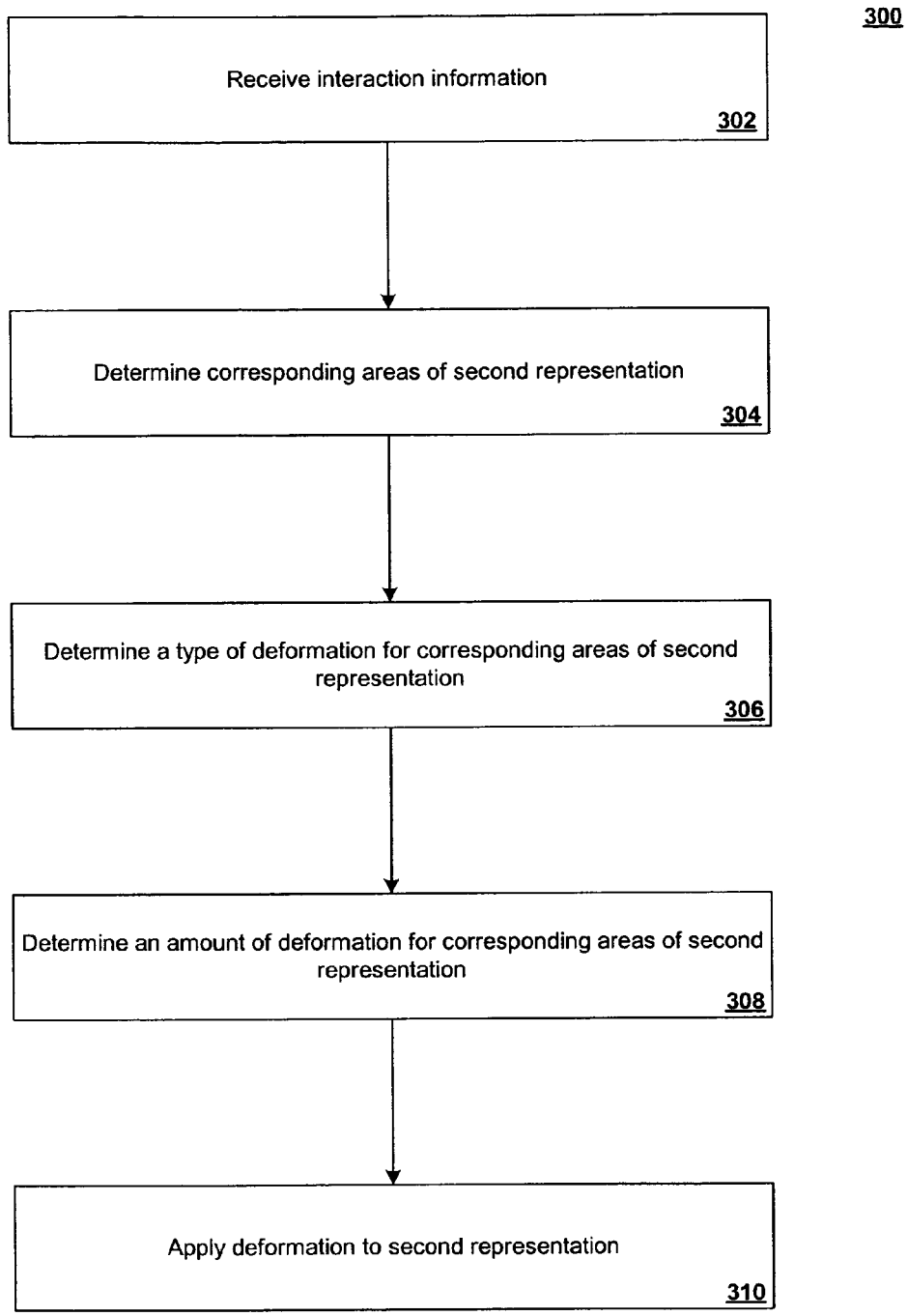
FIG. 3 is a flowchart in accordance with one embodiment of the present invention for deforming representations of digital content.

FIG. 3 is flowchart in accordance with one embodiment for deforming representations of digital content. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Figure 4:
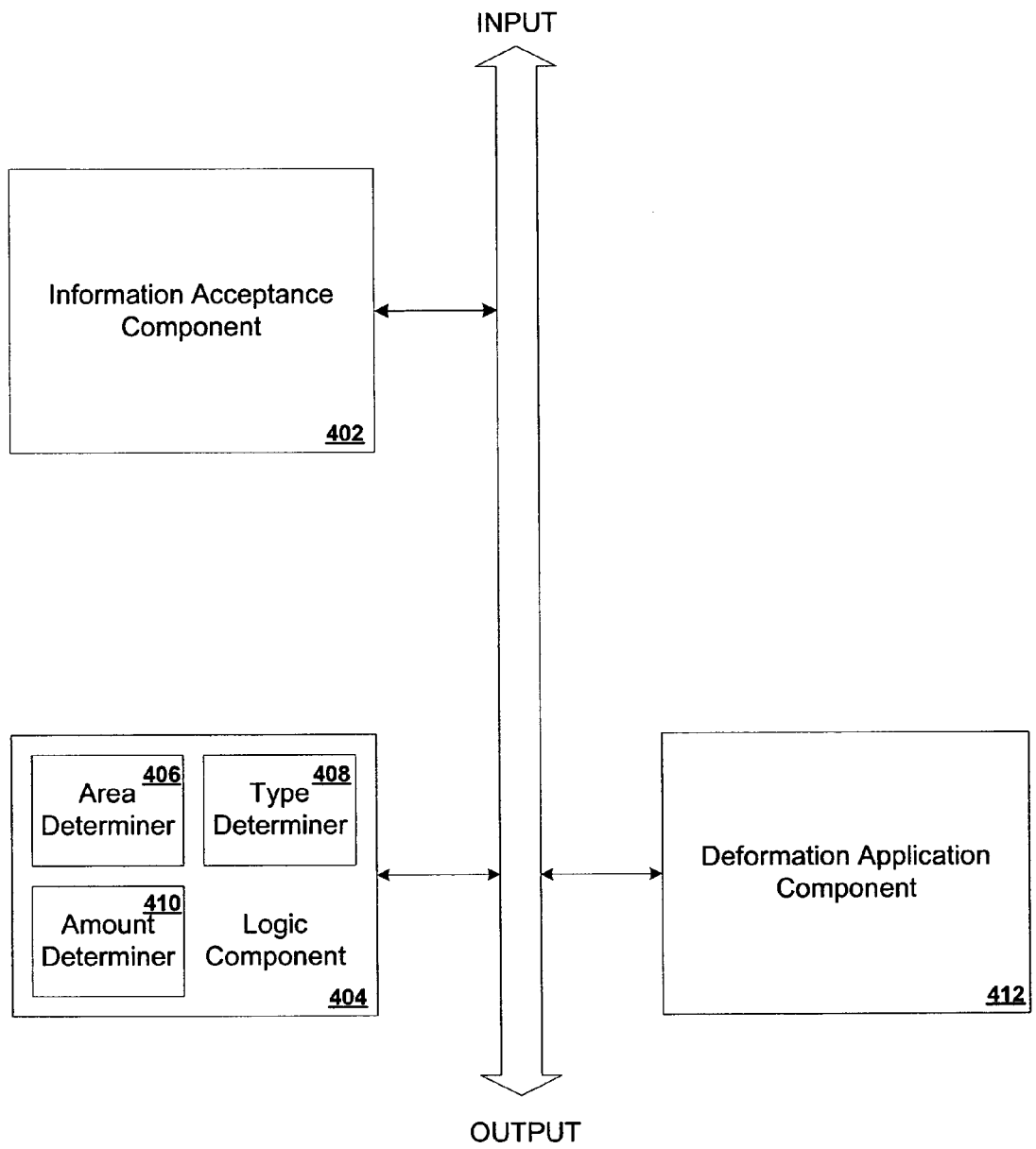
FIG. 4 is a system in accordance with an embodiment that can be used in the deformation of representations of digital content.

In one embodiment, the flowchart can be performed in conjunction with step 108 of FIG. 1 when deforming a second representation of digital content. FIG. 4 illustrates an exemplary system that can be used to deform representations of digital content. Although this diagram depicts objects/processes as logically separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks. In various embodiments, the system of FIG. 4 can be implemented as deformation component 208 and/or to execute the flowchart of FIG. 3.

At step 302, interaction information can be accepted. In one embodiment, interaction information is accepted by receiving the information at deformation component 208 from information maintenance component 206. Information acceptance component 402 can receive and/or retrieve interaction information from any storage location including from other applications. By way of non-limiting example, the acceptance component can access interaction information from dedicated storage units as well as from files containing information for digital content.

At step 304, areas of a second representation corresponding to interaction areas of a first representation can be determined. Area determiner 406 of logic component 404 can determine corresponding areas in one embodiment.

In accordance with the various types of information identifying interaction areas, area determiner 406 can determine corresponding interaction areas. Pixel coordinate(s) identifying an interaction area of the first representation can be used to determine a corresponding area of a second representation in one embodiment. Corresponding interaction areas of the second representation can be determined by scaling the coordinate(s) in accordance with the ratio of the scales of the two representations.

Unique identifiers can also be used to identify corresponding interaction areas of a representation. Corresponding interaction areas of a second representation can be determined by identifying a corresponding unique identifier of a second representation. Various software applications may use the same or similar unique identifiers that can be used to deform corresponding areas of a second interface. For example, an interaction area corresponding to a menu item of a software application interface can be identified by a unique identifier. A corresponding unique identifier of a second application can be identified to determine a corresponding area in a representation of an interface of the second application. Unique identifiers can be used in embodiments where interactions with a first representation of a GUI for a software application are used to deform a second representation of the GUI for the software application. Moreover, unique identifiers can be used where interactions with a GUI of a first software application are used to deform a GUI of a second software application.

Unique identifiers can also be used when interactions with a representation of a first web page or similar document are used to deform a representation of a second web page or document. A document or file, such as an html document, for a second web page can be searched to identify a corresponding unique identifier from which a corresponding interaction area can be determined. Destination URL addresses can be used to determine corresponding areas of a second interface in applications for web pages. An interaction area of a first web page corresponding to a hyperlink can be identified using a destination URL address of the hyperlink. A file or document representing a second web page can be searched to identify a hyperlink having the same destination URL address. From the URL address, a corresponding area of a representation of the second web page can be determined.

Image comparison can also be used to determine corresponding areas of a second representation. An image or other graphic corresponding to an interaction area can be used to identify an interaction area of a first representation such as an interface. Area determiner 406 can compare the image or graphic with images or graphics of areas of a second representation such as that of a second interface. A corresponding area of the second representation can be determined from a matching comparison.

At step 306, a type of deformation to apply to the corresponding areas of a second representation can be determined. In one embodiment, information identifying a type of deformation to apply can be maintained as part of the interaction information. A type of deformation can be stored along with interaction information determined at step 104. When the information is accessed, type determiner 408 can determine the type of deformation to apply from the specified information.

In other embodiments, a type of deformation is not maintained with interaction information. In such embodiments, type determiner 408 can determine a type of deformation from a set of default types of deformation, user-specified type of deformation, and/or type determiner can determine a type of deformation by evaluating the interaction information. In one embodiment, type determiner 408 includes a set of rules to be used in determining types of deformation. An interaction area can be evaluated and a type of deformation determined using the rules. For example, type determiner 408 may determine that active area deformation is to be applied to corresponding active interaction areas and a zoomed layout deformation applied to other corresponding interaction areas using a set of rules.

At step 308, an amount of deformation to apply to corresponding areas of a second representation can be determined. As with the type of deformation, information identifying an amount of deformation to apply to an interaction area can be maintained along with the interaction information in one embodiment. In other embodiments, an amount of deformation can be determined by amount determiner 410 using a default set of deformation amounts, user-specified amounts of deformation, and/or from an evaluation of the interaction information. A set of rules that can be configured by a user can be used in one embodiment. By way of a non-limiting example, amount determiner 410 can access information relating to degree and sequence of interaction with interaction areas to determine an amount of deformation. The amount of deformation applied to a corresponding interaction area can be increased according to the number of times an area is interacted with or according to a relative interaction with an area.

In one embodiment, determining a type and amount of deformation for areas of a second representation includes determining an animation sequence to apply to corresponding interaction areas. Logic component 404 can determine an animation sequence using degree and sequence of interaction information. For example, an order of deformation of interaction areas can be determined from the sequence information and areas of greater interest or interaction can be presented for longer periods of time during the animation or deformed by a larger amount during the animation. As with other deformations, animation sequences can be maintained along with interaction information or animation sequences can be determined by logic component 404 from such information as the type of interaction area.

In one embodiment in accordance with the present invention, types and amounts of deformation can be determined from user specified parameters. For example, an exemplary application of the present invention can include configurable deformation options for rules used in determining amounts and types of deformation. A user can select types of deformation, amounts of deformation, whether to apply deformation, and to what types of areas to apply deformations. A user can select whether or not to apply deformations and if so, what type of deformations to apply. A user can also select to have different deformations apply to different types of identified interaction areas. Additionally, a user can select to have deformations applied to representations of some application interfaces and content and not to other representations of interfaces and content. For example, in a background application implementation, a user could select to only have deformations applied to her internet browser or word processing program and content presented through the interfaces of the programs. Furthermore, a user can elect to have deformations applied to certain representations of digital content and not other representations of the digital content. For example, a user may select to have deformations applied to representations of software application interfaces when viewing them on a PDA and not when viewing them on a laptop or desktop. In one embodiment, the user specified parameters can be used to determine an amount and type of deformation at the time of rendering a second representation. In other embodiments, the user specified parameters can be maintained along with interaction information.

At step 310, the amount and type of deformation can be applied to a second representation. In one embodiment, deformation application component 412 can apply deformation to a second representation. Using the information determined at steps 306 and 308, the deformation can be applied to the corresponding areas determined at step 304.

By way of non-limiting example, deformation application component 412 can apply deformation to a second representation by accessing a document object model of digital content in order to change the content's appearance or representation. A specification of how objects are represented in the content can be determined. Furthermore, how attributes are associated with objects and how each can be manipulated can be determined. The attributes and objects can then be manipulated in accordance with interaction information. In one embodiment, the original digital content is not modified in order to deform the second representation. In other embodiments, digital content itself can be modified and/or manipulated. In one embodiment, the deformation can be applied dynamically as a representation is rendered.

In one embodiment, deformation is only applied to representations that are scaled. A representation size may be compared to a nominal representation size of the same or similar digital content. If the representation is determined to be scaled representation, interaction information can be used to deform the representation. In another embodiment, deformation is only applied to representations that are scaled-down.

Deformation can be applied to an original representation of digital content and/or other representations of the same digital content or of different digital content. For example, a user may interact with a representation of digital content on a desktop machine and another representation of the digital content on a PDA. User interaction with representations presented on the desktop machine can be used to determine interaction information that will be used to deform representations of the same content on the PDA. Deformation can be applied to a representation of the content on the PDA without the deformation propagating to the original representation or to the underlying digital content itself, although the deformation can propagate to the original representation or underlying content if so desired. Furthermore, interactions with a representation on the desktop can be used to deform the same representation of the same digital content on the desktop, a different representation of the same digital content on the desktop, or a representation of different digital content on the desktop. It will be apparent to those of ordinary skill in the art that various implementations can be utilized depending on the needs of a particular application in accordance with embodiments.

Various types of deformation can be applied to representations of digital content in accordance with various embodiments. As previously discussed, active areas can include any area capable of receiving user input and/or providing an action in response to user input. Active areas are often represented by a graphical representation of the active area. In many cases, active areas correspond directly with a graphical representation of the active area. For example, an active area corresponding to a hyperlink often covers the same area as a graphical representation of the hyperlink (e.g., a text passage, image, etc.). However, an active area can be expanded or contracted or otherwise made to be of a size not commensurate with the graphical representation of the active area.

Figure 5A:
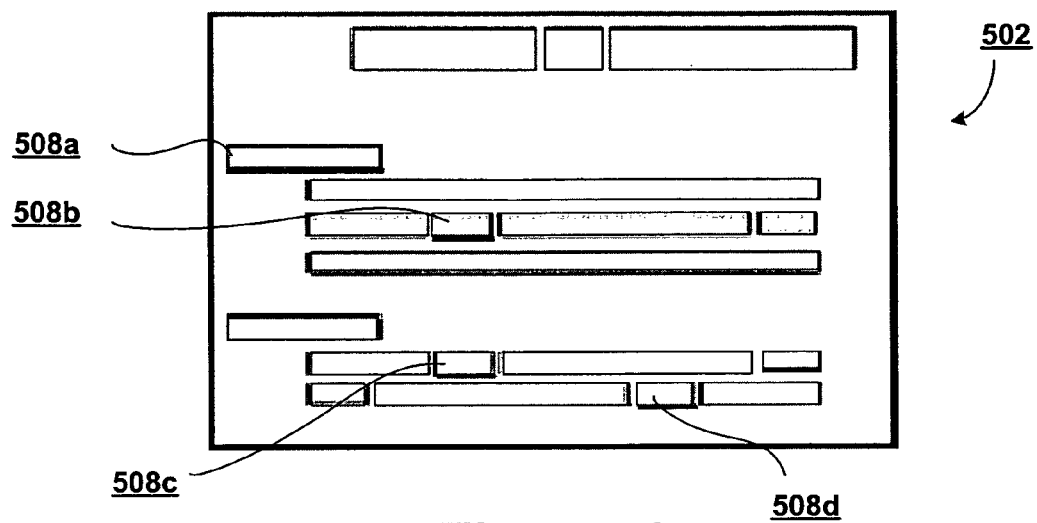
FIG. 5a illustrates an exemplary first representation of content, wherein interaction areas of the first representation have been determined.

FIG. 5a illustrates an exemplary first representation 502 of digital content. By way of a non-limiting example, first representation 502 could be of an interface such as a word processing program or of some content such as a web page, document, image, or of some other suitable content. Representation 502 can include active areas as shown by the boxed lines. If representation 502 is of an interface, the active areas may correspond to menu items, etc. If representation 502 is of a web page, e.g., the active areas may correspond to hyperlinks, text input fields, or other selectable areas. The boxed lines illustrate the active area itself and not the graphical representation of the active area. As illustrated, active areas 508a-508d have been determined to be interaction areas. The underlining is provided merely for purposes of explanation and is not intended to represent actual content that would be presented in the representation.

Figure 5B:
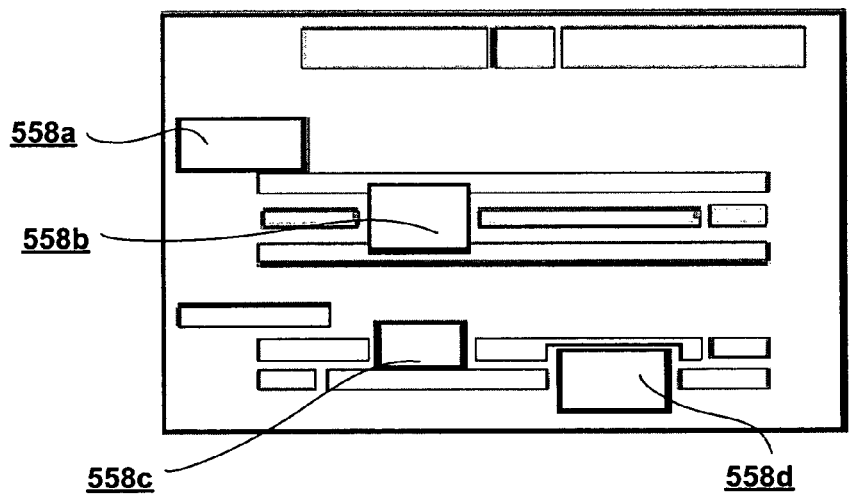
FIG. 5b illustrates an exemplary second representation of the content of FIG. 5a, wherein active area deformation has been applied to the second representation in accordance with an embodiment.

FIG. 5b illustrates an exemplary corresponding second representation 552. As discussed, second representation 552 could be a scaled version of first representation 502, a representation of an interface for a second application, a representation of different digital content such as a second image, etc., or even the same representation as first representation 502. Using the identification of interaction areas from first representation 502, corresponding interaction areas of representation 552 can be deformed. As illustrated, active interaction areas 558a-d have been expanded relative to the overall size of the representation. Thus, a user can more easily select the interaction areas while still being able to select adjacent areas as well. The larger selectable areas can facilitate eased navigation and selection. When deforming active areas, including menu items, etc., the graphical representation of the active area or menu item need not be modified, although it can. In one embodiment, only the active area itself is deformed. In other embodiments, the active area can be deformed and the graphical representation or layout also deformed as discussed below.

Active areas can be deformed using other techniques and methods in accordance with embodiments of the present invention. FIGS. 5a-5b illustrate a simple example of expanding the selectable region of an active area. In another embodiment, the selectable regions can be expanded such that they overlap adjacent active areas. In yet another embodiment, selectable regions of adjacent active areas can be contracted to facilitate selection of interaction areas.

In one embodiment in accordance with the present invention, user interaction and behavior can be used to deform the layout of a representation. User behavior and interaction can be used to deform any area of a representation, not just that of active areas. Layout deformation differs from deforming an active area itself in that the graphical representation of an area is deformed, rather than an active area. If a graphical representation of an area corresponds to an active area, the active area may or may not be deformed. It will be understood by those of ordinary skill in the art that various combinations and subcombinations of the deformation systems and methods discussed herein can be useful in various applications and systems.

Deforming the layout of active areas corresponding to interaction areas can provide for improved interaction with an interface and/or other representations of digital content. Deformation of the layout of active areas corresponding to interaction areas can provide useful feedback to a user that they can interact at an area. The deformation can lessen the burden of searching through scaled-down content to find an active area. Additionally, deforming the layout can improve the presentation of an interface or content and make the interface and content more engaging.

Numerous deformation techniques can be used in accordance with embodiments of the present invention for layout deformation. For example, zooming in/out at an interaction area, presenting a fisheye perspective of interaction areas, using a tool tip feature to provide additional content such as what would be provided if an active area corresponding to an interaction area were selected can all be used. Deformation can be combined with other techniques to further enhance the presentation of an interface and content. In one embodiment, the layout of interaction areas can be deformed based upon input received from a user. Deformation can occur upon a user placing a cursor over an interaction area or upon a user placing a cursor over an interaction area and simultaneously providing input by selecting with an input device such as mouse. Furthermore, in touch-screen based interactions such as with a PDA, a layout deformation of the interaction areas can begin as a user places an input device on a screen (pen-down) and individual interaction areas can be deformed as the cursor is moved across the area. By waving or moving a cursor across the interface, a user can quickly identify points of interest based upon past user interaction.

Figure 6:
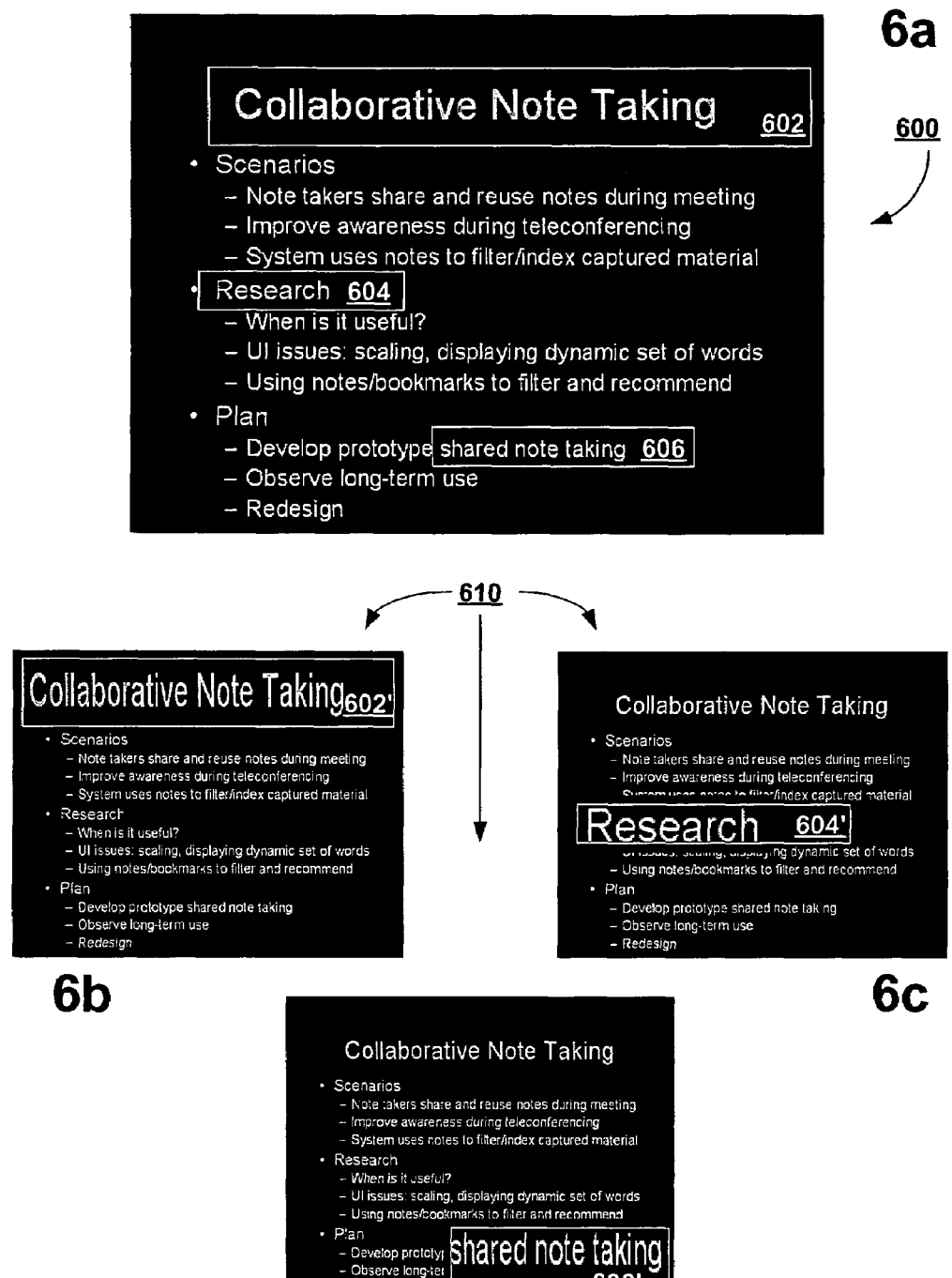
FIG. 6a illustrates an exemplary first representation of digital content having determined interaction areas in accordance with an embodiment.
FIGS. 6b-6d illustrate an exemplary second representation of the digital content of FIG. 6a having an animation applied to corresponding interaction areas in accordance with an embodiment.

In one embodiment of the present invention, layout deformation can be implemented as an animation. As illustrated by FIG. 6, each interaction area can be brought to the foreground in turn. FIG. 6a illustrates a first representation 600 of digital content (without deformation) in which areas 602, 604, and 606 have been determined to be interaction areas. The boxed lines around the interaction areas have been provided merely for purposes of explanation. They are not intended to represent actual content of the representations. FIGS. 6b-6d illustrate a second representation 610 of the digital slide over a period of time. An animation is applied to the representation such that corresponding interaction areas 602', 604', and 606' are each enlarged for a period of time to bring the user's attention to the interaction areas. In various embodiments, the animation can be presented once when representation 610 is rendered or can repeat multiple times.

In one embodiment, an animation can be implemented to occur automatically upon rendering a representation. In other embodiments, user input can be combined with animation to quickly present interaction areas to a user. For example, passing a cursor over a representation can trigger an animation of interaction areas. The animation can respond to the input received from a user. In one embodiment, only the vertical position of the cursor is used to present an animation of underlying interaction areas. By passing the cursor up or down the representation, all interaction areas at a similar vertical location to the cursor can be deformed using an animation. The deformation can occur regardless of whether the cursor actually passes over the interaction area.

Deformation can also be dependent on the nature of the tracked user interaction and behavior. In one embodiment, the number of times a user interacts with a particular area of a first representation can be tracked. When the interaction area is rendered in a second representation, the number of times the interaction area was selected can be used to determine the amount of deformation to apply. The amount of zoom or to what degree an area is enlarged can be determined using the number of times the user interacted.

In one embodiment, the number of times an interaction area is selected relative to other interaction areas can be used to determine an amount of deformation. In addition, the type of deformation can depend upon the degree of interest determined for an area. For example, frequently selected areas can be automatically enlarged or animated while less selected areas can be enlarged upon cursor over.

Figure 7:
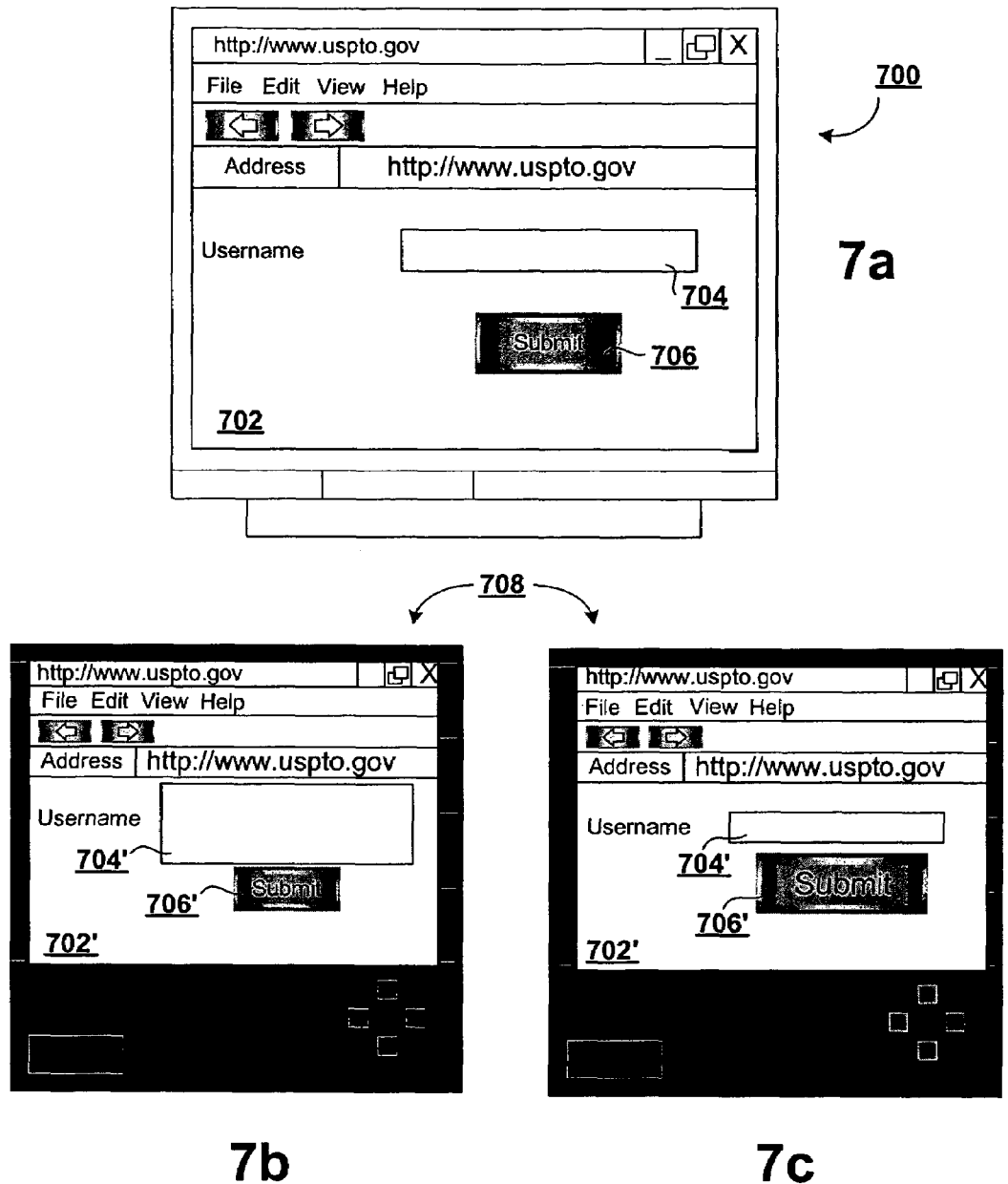
FIG. 7a is an exemplary first representation of a web browser interface having a first representation of a web page presented through the web browser in accordance with an embodiment of the present invention.
FIGS. 7b-7c is an exemplary second representation of the web browser interface having a second representation of the web page presented through the web browser, wherein layout deformation has been applied to the second representation of the web page in accordance with an embodiment of the present invention.

In one embodiment in accordance with the present invention, a sequence of interaction or behavior with a first representation can be used in deforming the layout of a second representation. By way of a non-limiting example, Web pages often include text boxes and a "submit" button to instigate transmission of the data provided in the box. As illustrated in FIG. 7, a representation 702 of a web page on a first device 700 can include textbox 704 to receive user data and a "submit" button 706 to instigate transmission of the data to the web page provider. It can be determined by observing and tracking user behavior with the representation of the web page that one or more users interacting with the page typically provide text in the box, then position a cursor over the submit button, and then select the button. The tracked information regarding the sequence of interaction can be used when a second representation of the web page is rendered.

As illustrated in FIGS. 7b and 7c, a scaled representation 702' of the web page has been rendered on PDA 708. FIGS. 7b and 7c illustrate the representation over some period of time. Information regarding interaction with representation 702 can be used to create an animation whereby text box 704' is first enlarged to facilitate receiving data as illustrated in FIG. 7b. Thereafter, as illustrated in FIG. 7c, submit button 706' can be enlarged to facilitate selection thereof. In one embodiment, the animation is time based, deforming interaction areas for periods of time. The animation can also be based on user input. A first interaction area can be deformed based upon the determined sequence of interaction. After receiving input, a second interaction area can be deformed. The above animation technique can also be combined with active area deformation to further improve the usability of the interface and content. In one embodiment, a first user's interaction with a representation of the web page can be used to determine interaction information that can then be used to deform a representation of the web page presented to a second user.

In various embodiments, any interaction can be deformed or only interaction areas corresponding to active areas can be deformed. In some applications, it can be useful to deform all interaction areas and then deform only interaction areas corresponding to active areas. Additionally, a first type of deformation may be applied to interaction areas corresponding to active areas and a second deformation applied to all other interaction areas. For example, it may be useful to deform non-active interaction areas by enlarging the area upon cursor over. For active interaction areas, however, it may be useful to automatically expand them. Additionally, if a non-active interaction area is enlarged such that it overlays an active area, an indication such as a visual highlight around the non-active area can be used to indicate the presence of an active area below the non-active enlarged area.

As discussed above, systems and methods in accordance with embodiments of the present invention can be used to improve functionality in various software applications. For example, software is available that can allow an author to create a presentation such as a slide presentation and then present the presentation to a group of end-users, whereby the end-users can view the presentation on a personal device such as PDA, laptop, cell phone, etc. The devices of the presenter and the end-users may be connected to a network such that the presenter can control the presentation and the slides currently selected by the presenter can be presented to the end-users. Slide as used herein is intended to reference any content forming part of a digital presentation. By way of a non-limiting example, a slide can be or include audio, video, images, and any other suitable content. In one embodiment, a slide is captured and presented at an end-user's device.

Figure 8:
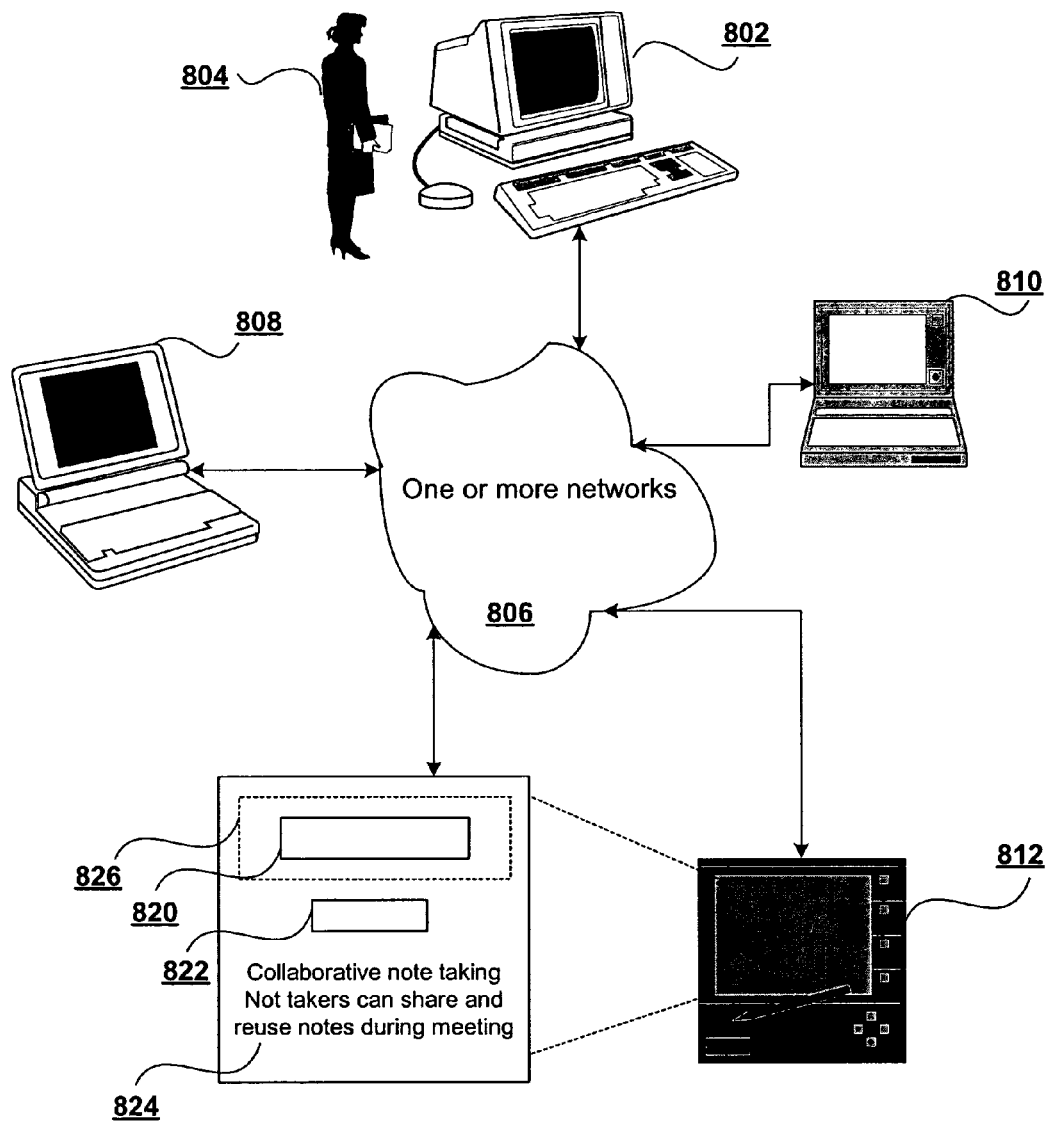
FIG. 8 is a system in accordance with an embodiment for using interaction information in a meeting software application.

FIG. 8 is a system in accordance with an embodiment for using interaction information with a meeting software application. The interaction of presenter 804 with a representation of the presentation can be monitored while authoring and/or presenting the presentation. Interaction may be monitored on any device including computer 802. In an embodiment, a monitoring component can be implemented at network 806.

Monitoring components on network 806 and/or devices 808-812 can monitor user interaction with representations of the presentation. Monitoring user interaction can include monitoring end-user selection of areas within a representation of the presentation slides and/or a representation of an interface of a meeting software application.

Interaction areas can be determined from user interaction with representations of the presentation. A logic component such as logic component 204 can be implemented at network 806 or on devices 808-812 to determine interaction information. Interaction within areas (textual, image, etc.) defined by an author of the presentation or by application itself can be used to determine that an area defined by the boundaries is an interaction area. End-users can also select areas using an input device such as by "highlighting" an area. For example, an end-user may highlight a textual passage in order to "copy" it to another interface, file, application, etc. An area defined by any such interaction can be determined to be an interaction area.

In one embodiment, a meeting software presentation application can allow users to append annotations to the content of a presentation. An annotation can include the addition of any content such as text to a presentation or portion thereof. Annotations can propagate to representations of the presentation on everyone's device or to a local representation on a device of the user who is interacting.

In one embodiment, pre-defined areas of content such as text boxes 820 and 822 shown in the expanded display of device 812 can be provided so that an end-user can select an area to provide annotations thereto. These annotatable areas can have corresponding active areas such as active area 826 of text box 820. An area can be defined by an author of the presentation or by a provider of the application. An end-user viewing the presentation can also select areas that are not pre-defined to add annotation. In one embodiment, the user's selection of such an area is used to make the area active (selectable for annotation). For example, a user may use a mouse to highlight a text passage such as passage 824 and add an annotation to the passage. In response to the user's selection of the passage, the passage can be made active on representations of the slide. An area to which a user has provided an annotation can also be determined to be an interaction area.

Interaction information can be maintained by a maintenance component such as maintenance component 206 at individual devices or at network 806. For example, a file containing interaction information can be stored at network 806. Representations of the presentation on one or more devices can be deformed using the maintained interaction information. The deformation can include deforming a representation on all devices or only on select devices.

A deformation component can be implemented at network 806 and/or the individual devices. In one embodiment, a deformation component at network 806 can use interaction information to deform representations of the presentation before they are provided to the individual devices. For example, before a slide captured for transmission to an individual device is transmitted to a device, data for the slide can be modified in accordance with the interaction information.

In another embodiment, a deformation component or an individual device can accept interaction information and deform a representation before it is rendered on the device. A slide may be provided to the device. Interaction information can be provided to the device as well. The information can be imbedded in data for the slide or can be provided in a separate file. The deformation component can apply the interaction information to the slide before it is rendered on the device.

In one embodiment, interaction information used in conjunction with meeting software applications can be used to improve the presentation of a representation to a second user based on the interactions of a first user. For example, a first user may select an annotatable area or highlight an area. The interaction information determined from the first user can be used to deform a representation presented to a second user. The deformed representation can include deformed active areas that allow for easier selection, a deformed layout to enhance the presentation and/or bring a user's attention to areas of interest, and also newly defined active areas. The first user's interaction (e.g., highlighting a text passage) can be used to make a corresponding text passage of a representation presented to a second user an active area. Thus, the second user need only click within the new active area to select the text passage. The second user need not highlight the entire passage to select it.

In one embodiment, a user can save one or more slides of the presentation locally. In one such embodiment, interaction information can be applied such that the saved representation is deformed. In another embodiment, interaction information can also be stored locally so that a representation of the presentation can be deformed thereafter when rendered.

Virtual networks allow users to remotely access devices and content from any location. For example, a user may use a desktop computer connected to an office network during the workday. Using virtual network software, the user can remotely access his desktop machine, another device on the office network, applications on the network, and other content on the office network from anywhere. The user may use virtual network software on his PDA, cellphone, or laptop in order to remotely access his work network over the internet.

In many virtual network applications, a representation of content on a remote network is transmitted to the user's remote device. In some applications, the user receives an image representing content on the network. The user can interact with the representation of the image on the remote device. User input can be transmitted to the network where it can be processed by an application running on the network.

Some virtual network applications scale the image for presentation on the end-user's device. For example, a representation of an internet browser interface may be scaled-down so that a user can view the entire interface. If the transmitted image is scaled-down, a user must interact with the smaller representation, thus making interaction more difficult.

Figure 9:
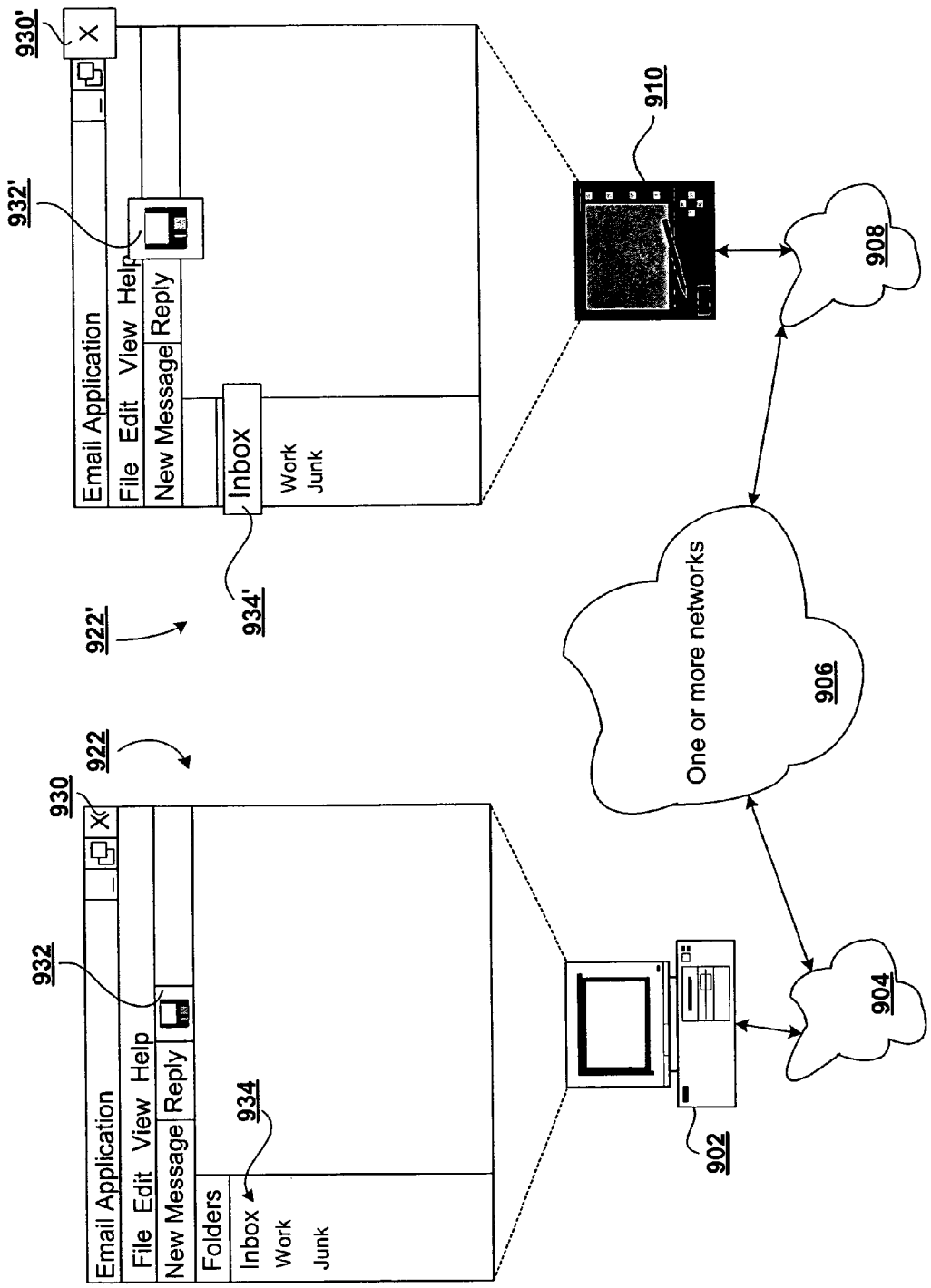
FIG. 9 is a system in accordance with an embodiment for accessing content with a remote device, wherein a representation of the content can be deformed for presentation on the remote device.

FIG. 9 illustrates a system whereby a device 902 (a desktop computer as shown) connected with a network 904 is accessed using a remote device 910 (a PDA as shown). As shown, the devices are in communication with each other over networks 904, 906 and 908. It will be understood that the two devices can communicate in any suitable manner as is known and understood in the art. For example, both devices may be connected to a single network, both devices may be in communication over a dedicated connection, or both devices can communicate over a plurality of networks.

A representation 922' of content presented on the PDA has been deformed using interaction information determined from user interaction with a device connected with network 904. Representation 922 depicts content of desktop computer 902. However, no representation need actually be rendered by computer 902 or network 904 while a user is remotely accessing the device or network. Representation 922 is shown for clarity of discussion. It should be noted that the user need not be controlling the same desktop computer on which interaction was monitored to determine interaction information. Interaction information can be maintained on the network and accessed when a user is connected with the network in any way.

Figure 10:
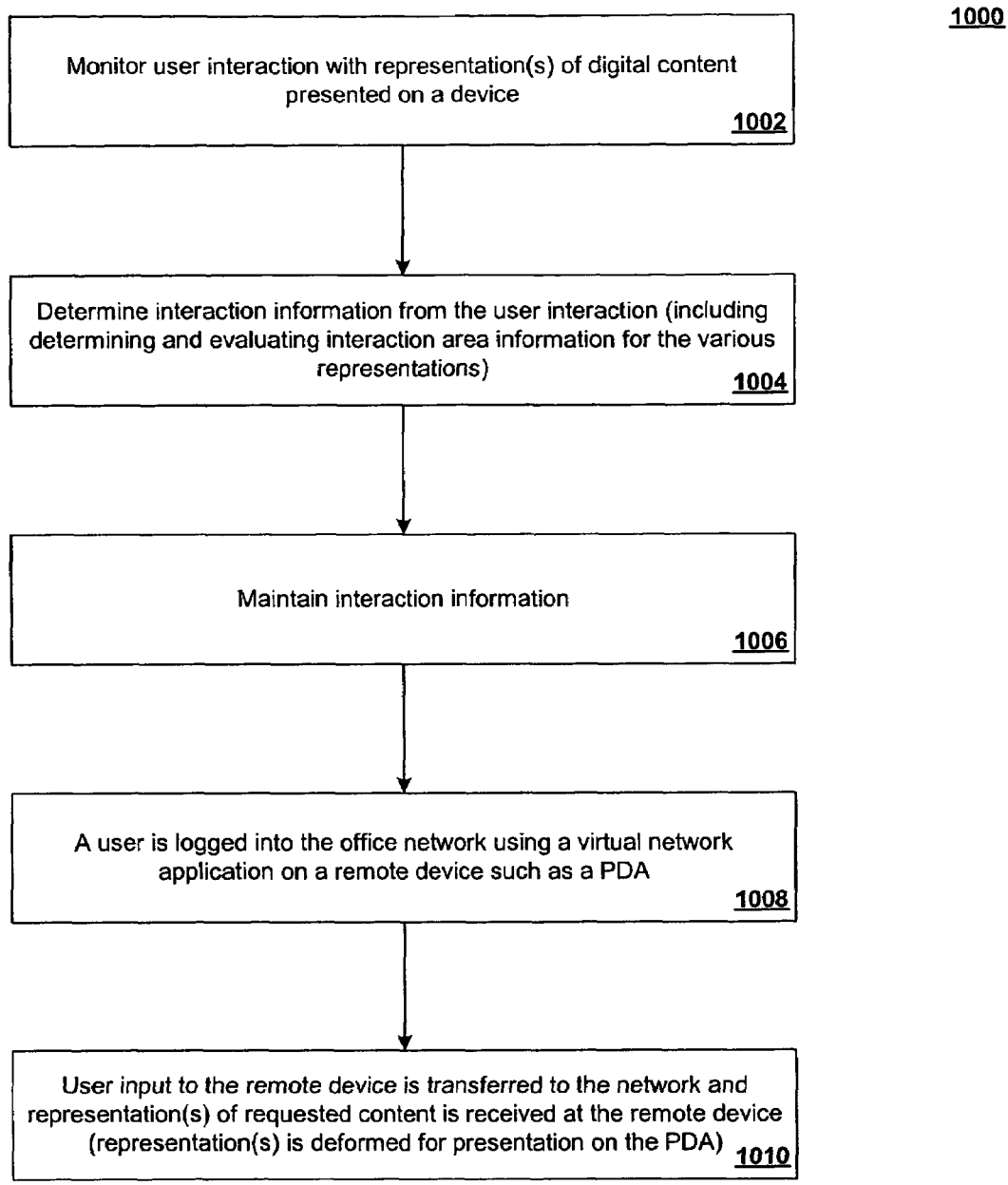
FIG. 10 is a flowchart in accordance with an embodiment for deforming representations of content on a remote device.

FIG. 10 is a flowchart in accordance with an embodiment for deforming representations of content on a remote device that is accessing a network and/or another device using a virtual network software application. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

At step 1002 of FIG. 10, user interaction with representations of digital content on one or more devices (such as desktop computer 902) are monitored. A monitoring component can be implemented at device 902, network 904, network 906, and/or network 908.

Interaction with representations of web pages, software application interfaces, and other content can be monitored. The interaction can be used to determine interaction information at step 804. Determining interaction information may include determining interaction areas of representations of multiple documents, web pages, and GUI's. Interaction area information may be evaluated to develop degree and sequence of interaction information. One or multiple users' interaction with one or multiple devices can be monitored to develop the interaction information. A logic component can be implemented at device 902, network 904, network 906, and/or network 908 to determine interaction information.

At step 1006, the interaction information can be maintained. An information maintenance component at any device or network can maintain the information. The information may be persisted anywhere on the networks, including as a file on a storage device or on a computing device on which interaction was monitored. In one embodiment, the interaction information is stored at a proxy server. In one embodiment, a file containing interaction information of a user can be associated with the user using a username, for example, so that when a user logs in to the network, his individual interaction information can be used to deform representations of content the user is accessing.

At step 1008, a remote user is logged into the network using a standard virtual network software application on a remote device such as PDA 910 for example. At step 1010, the virtual network application can transfer user input from the remote device to the network and on to a device connected with the network. At the network, the user input can be received and used to transfer a representation of content requested by the user to the remote device. For example, a representation of the "desktop" (including, e.g., an operating system interface and other application interfaces being used) of desktop computer 902 can be transferred to the user. Thus, the user can remotely control the desktop computer.

Figure 11A:
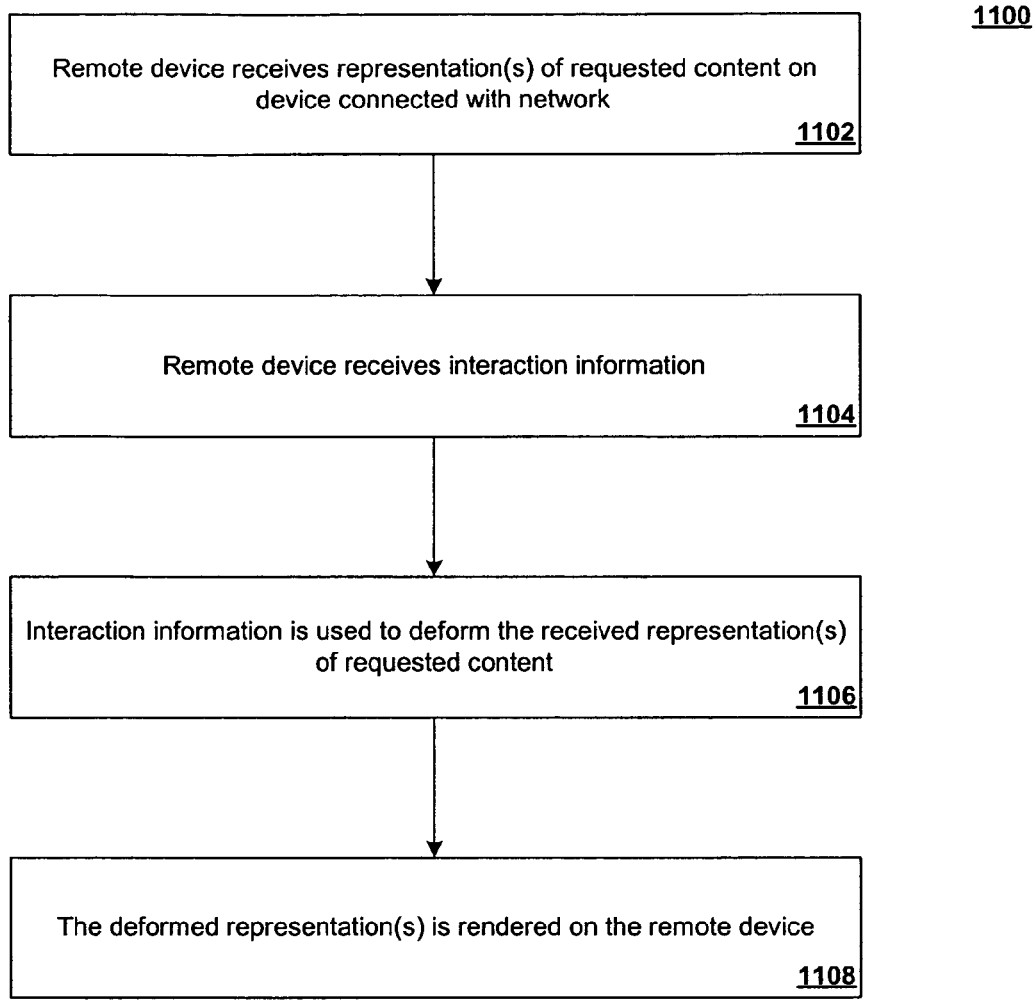
FIG. 11a is a flowchart in accordance with an embodiment wherein interaction information is used at a remote device to deform representations of digital content.

FIG. 11a is a flowchart in accordance with an embodiment wherein interaction information is used at the PDA to deform representations of content. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In one embodiment, the flowchart of FIG. 11a can be used as part of step 1010 of FIG. 10. At step 1102, a representation (s) of digital content can be received by the remote device. As illustrated in FIG. 9, a first representation 922 of an email application is presented on device 902. Since PDA 910 is controlling desktop computer 910, a second representation 922' of the email application is presented on the PDA. As illustrated the second representation has been deformed.

At step 1104, interaction information can be received at PDA 910. PDA 910 can retrieve the interaction information or the information can be received along with the representation (s) at step 1102. At step 1106, the interaction information can be used at the PDA to deform the representation(s) received from the desktop device. For example, if an image representing content on the desktop is received, areas corresponding to interaction areas in the representation(s) could be enlarged or zoomed, etc. At step 1108, the deformed representation can be rendered on the remote device.

Figure 11B:
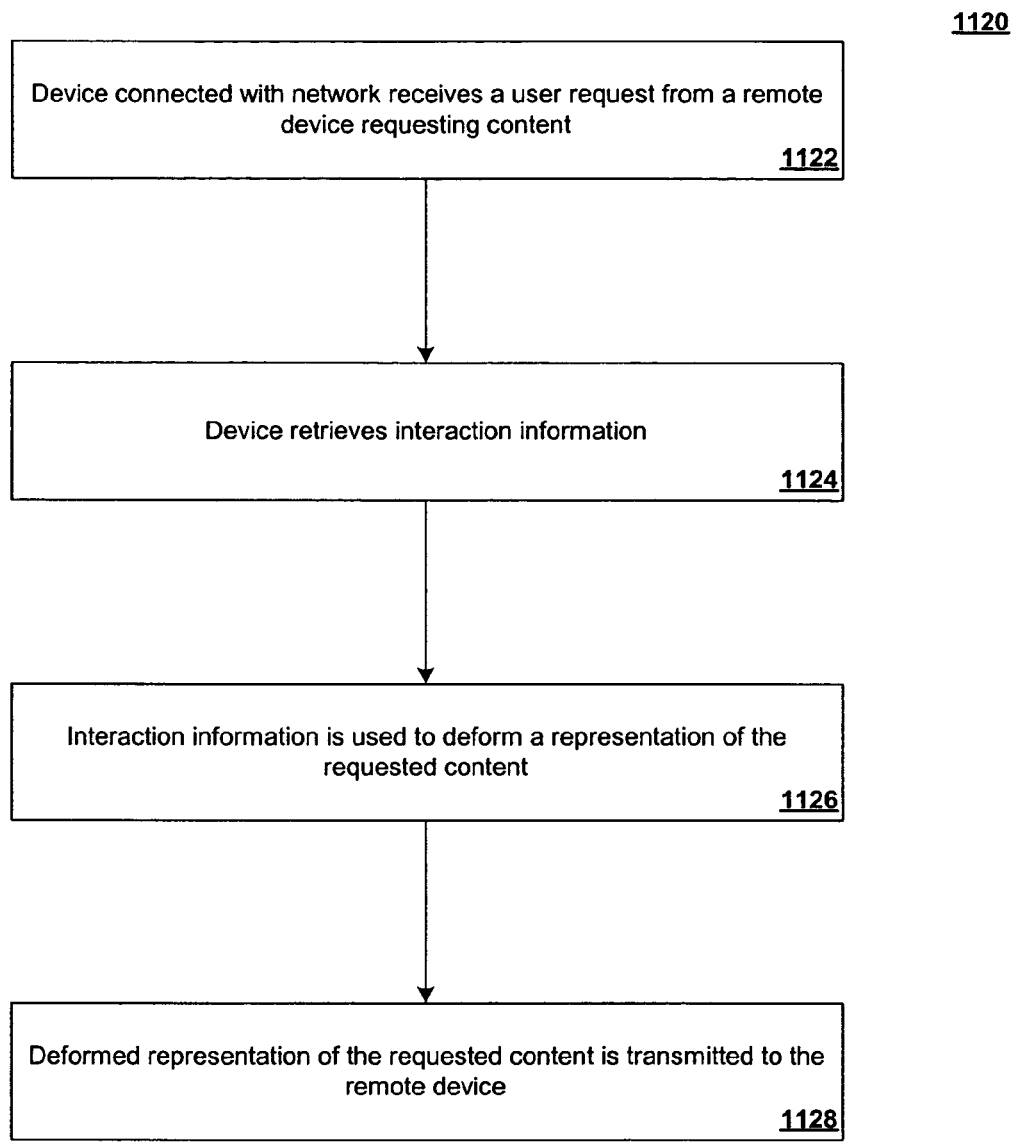
FIG. 11b is a flowchart in accordance with an embodiment wherein interaction information is used to deform representations of digital content prior to transmission to a remote device.

FIG. 11B is a flowchart in accordance with an embodiment wherein interaction information is used to deform representations of content prior to transmission to a remote device such as PDA 910. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

At step 1122, a device on the network such as desktop computer 902 receives a user request from PDA 910 for content on the network. At step 1124, interaction information is retrieved. At step 1126, the interaction information is used to deform a representation of the requested content. At step 1128, the deformed representation of the requested content is transmitted to the remote device.

Referring to FIG. 9, areas 930, 932, and 934 of first representation 922 are determined interaction areas of a representation of the requested content. Accordingly, corresponding areas 930', 932', 934' of the second representation rendered on display PDA 910 have been deformed. Thus, user interaction with representations of content presented on desktop computer 902 and/or other devices on network 904 have been used to deform the layout of representations of content presented on PDA 910. In this manner, a user's previous interaction with content can be re-used to enhance the usability of scaled-representations of the same content.

Figure 12:
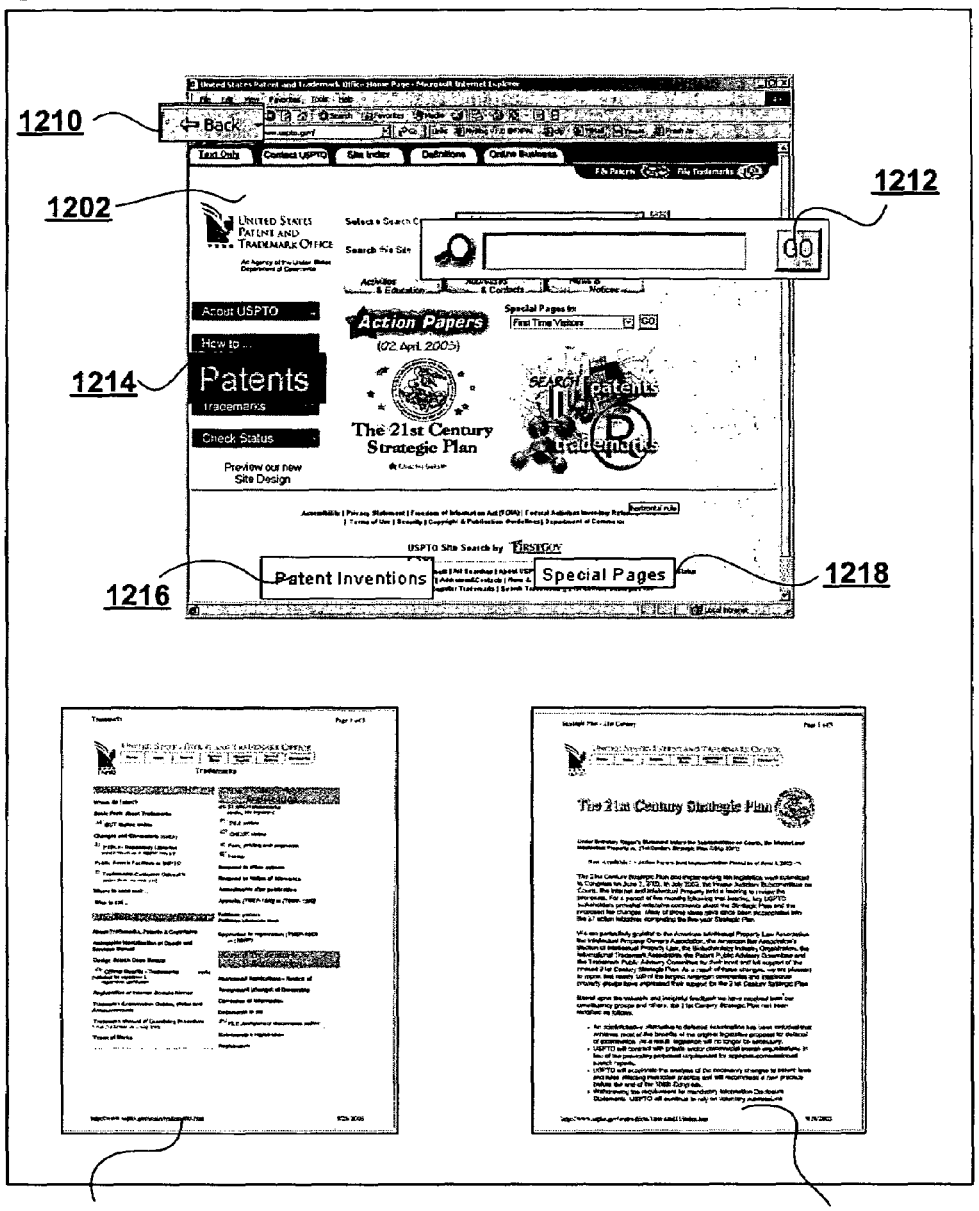
FIG. 12 is a system in accordance with an embodiment wherein user interaction with a representation of content on a first device can be used to improve a representation of the content on a shared device.

FIG. 12 is a system in accordance with an embodiment wherein user interaction with a representation of content presented on a personal device can be used to improve a representation of the content presented on a shared device. Dynamic bulletin boards, one type of shared device, can be used in public areas, work environments, and other areas to share information with groups of people.

Video display "bulletin board" 1200 can be used to share digital content and present representations of content to a plurality of people. By way of a non-limiting example, employees can post digital content to a bulletin board such that a representation of the content can be displayed on the bulletin board. Employees can post web pages, documents, presentations, or any other digital content found to be of interest. In many applications, multiple representations may be displayed on the board simultaneously.

Representations 1202, 1204, and 1206 of web pages have been posted to bulletin board 1202 are presented. Users connected with a network on which the board is connected can post content to the board as is known and understood in the art. For example, a server may host the content of the display and users can designate certain content using an application provided by the server.

As can be seen, an individual observing the bulletin board is presented with a considerable amount of content. Depending on a user's location relative to the display, viewing and interacting with the representations may be more difficult in their scaled form.

In one embodiment, a user's interaction with a representation of content is used to deform a representation of content presented on the board through the display. For example, an employee may interact with a web page at his desktop computer and then post the page to the board. The user's interaction with a representation of the web page on his desktop can be monitored, interaction information determined, and the information tracked. When the user posts the page to the board, the interaction information can be used to deform a representation of the page when presented on the display. A deformation component in accordance with an embodiment on a network connected with the display can access the interaction information and deform the representation of the web page presented on the display.

Representation 1202 of a web page includes interaction areas 1210, 1212, 1214, 1216 and 1218 that correspond to interaction areas determined by observing user interaction with another representation of the web page. In this example, corresponding interaction areas 1210, 1212, 1214, 1216, and 1218 of representation 1202 are enlarged.

By deforming the representations using the tracked interaction information, a viewer of the board can be presented with more targeted content. The representation can identify to the user which areas were determined to be have been of interest to a previous user. Thus, a viewer of the board can more quickly and easily absorb and otherwise take in the content presented by the representation. Furthermore, active areas can be deformed to improve interaction with the representations.

In another exemplary embodiment of the present invention, interaction with a representation of a digital image can be used to deform a scaled representation of the image such as a thumbnail. A user may interact with a representation of a digital image in order to edit or manipulate the image. For example, a user may utilize a photo editing application having a user interface to select certain areas of an image for editing. A user may select an area for copying or to adjust the brightness, color, contrast, etc. of a selected area. A user may further select particular areas in order to leave an annotation on the area.

Interaction areas within the image can be determined by monitoring user interaction with the image. For example, an API of an editing application can be accessed to determine events such as mouse clicks within the image. A user may use an input device to select particular areas of the image for editing, copying, annotating, etc. Areas selected by a user can be determined to be interaction areas. The interaction areas can be tracked and used to deform a scaled representation of the image. In another embodiment, image comparison can be used. Thus, interaction with a first representation of a first image can be used to deform a representation of a second image. For example, face recognition software can be used to identify corresponding areas such as the same face in a representation of a second image.

Figure 13A:
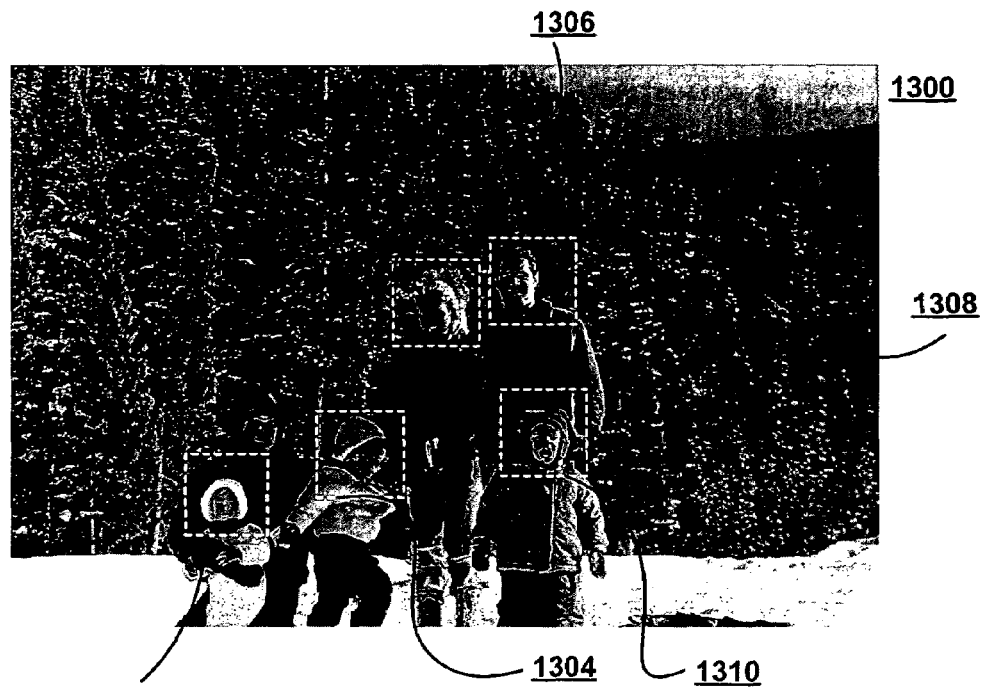
FIG. 13a is a first representation of a digital image having determined interaction areas in accordance with an embodiment of the present invention.

FIG. 13a illustrates an exemplary representation 1300 of a digital image without deformation. The representation could be a full size representation of the image presented on a desktop, etc. Areas 1302, 1304, 1306, 1308, and 1310 (dotted lines indicate the area determined to have been an interaction area and do not represent any part of the actual representation) have been determined to be interaction areas based on monitored user interaction with this representation of the digital image or another representation of the image.

Figure 13B:
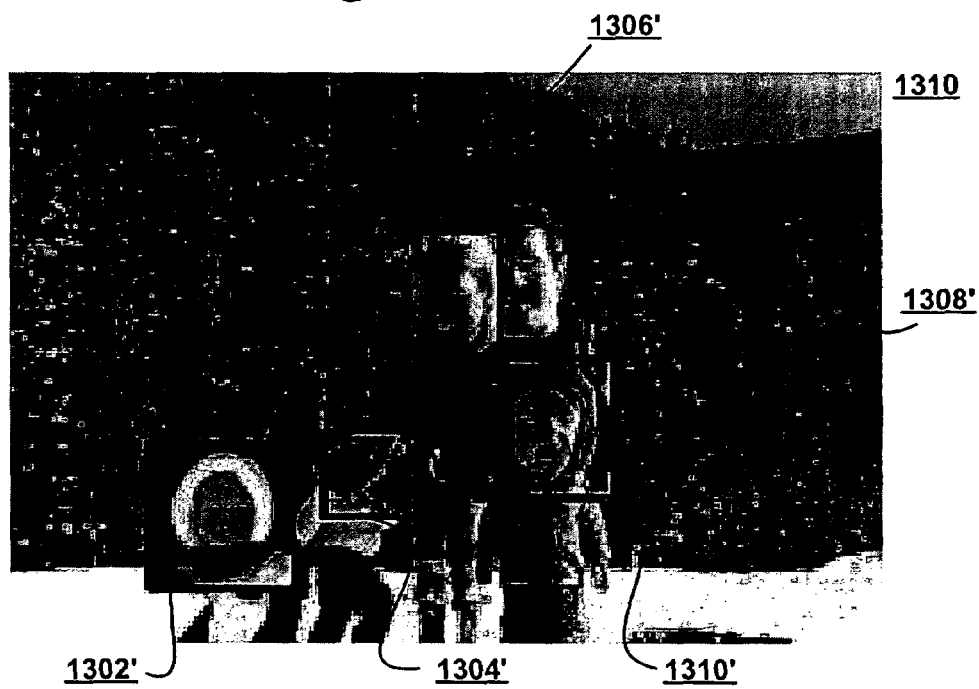
FIG. 13b is a second representation of the digital image of FIG. 13a having a layout deformed using interaction information in accordance with an embodiment of the present invention.

FIG. 13b illustrates a second representation 1310 of the digital image having applied deformations. Second representation 1310 could be a thumbnail or other scaled representation of the digital image. As shown, the layout corresponding to interaction areas 1302, 1304, 1306, 1308, and 1310 has been deformed. The corresponding interaction areas (1302', 1304', 1306', 1308', 1310') have been enlarged. The enlarged areas can facilitate eased understanding of and interaction with the scaled representation of the image. Other deformation techniques can be applied in addition to or in place of the shown deformation. For example, the interaction areas could be animated such that each interaction area is enlarged in turn. Such an example can help users understand the image without having to interact with it.

In one digital image example, a background application in accordance with an embodiment of the present invention can access interaction information to deform a representation of a digital image presented through a typical user interface such as those of internet browsers and photo editing software. In further embodiments, an application deforms a representation only when the representation is scaled in relation to a nominal or typical representation of the digital content.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user of other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for displaying a representation of digital content, comprising:
    monitoring user behavior while interacting with a first representation of digital content, wherein the user behavior includes interacting with a first display interaction area and at least a second display interaction area;
    determining interaction information from the user behavior, wherein the interaction information identifies the first display interaction area and at least the second display interaction area from the user behavior with the first representation of digital content and an order in which the first display interaction area and at least the second display interaction area of the first representation of digital content are selected;
    maintaining the interaction information;
    deforming a second representation of digital content using the interaction information, wherein deforming includes scaling at least one of the first display interaction area and the second display interaction area of the first representation of digital content based on the interaction information as the second representation, wherein the scaling alters the first display interaction area relative to the second display interaction area; and
    displaying the second representation of digital content, wherein a first display condition of the first display interaction area where the first representation is displayed is different from a second display condition of a second display area where the second representation is displayed.

2. The method of claim 1, wherein deforming a second representation includes deforming an active area of the second representation.

3. The method of claim 1, wherein deforming a second representation includes deforming a layout of the second representation.

4. The method of claim 1, wherein the first and second representation are of the same digital content.

5. The method of claim 4, wherein the digital content is at least one of a web page, a digital document, a digital image, an electronic book, a digital slide, and a graphical user interface.

6. The method of claim 4, wherein maintaining the interaction information comprises:
    adding the interaction information to a file containing data for the digital content.

7. The method of claim 1, wherein the first representation is a representation of first digital content and the second representation is a representation of second digital content.

8. The method of claim 7, wherein the first representation is a representation of a first graphical user interface and the second representation is a representation of a second graphical user interface.

9. The method of claim 1, wherein monitoring user behavior while interacting with the first representation comprises:
    monitoring user interaction with the first representation of digital content; and
    determining interaction areas from the user interaction with the first representation.

10. The method of claim 9, wherein monitoring user behavior while interacting with the first representation further comprises:
    evaluating user interaction with the interaction areas.

11. The method of claim 9, wherein deforming the second representation comprises:
    determining interaction areas of the second representation corresponding to the first representation;
    deforming the corresponding interaction areas.

12. The method of claim 11, wherein deforming the corresponding interaction areas includes at least one of enlarging the interaction areas, applying a fisheye perspective to the interaction areas, and zooming the interaction areas.

13. The method of claim 1, wherein monitoring user behavior while interacting with a first representation of digital content includes monitoring user behavior while interacting with at least one of a first representation of a graphical user interface, a first representation of a digital image, a first representation of an electronic book, and a first representation of a digital slide.

14. The method of claim 1, wherein maintaining the interaction information includes maintaining the interaction information with an identification of the digital content from which the interaction information was determined.

15. The method of claim 1, wherein deforming the second representation includes applying an animation to areas of the second representation using the interaction information.

16. The method of claim 1, wherein determining interaction information from the user behavior includes determining a degree of interaction with at least one area of the first representation.

17. The method of claim 1, wherein determining interaction information from the user behavior includes determining a sequence of interaction with the first representation.

18. The method of claim 1, wherein the first representation is not deformed when deforming the second representation.

19. The method of claim 1, wherein the first and second representation are representations of the same digital content, and wherein:
    the second representation is deformed without modifying the digital content.

20. The method of claim 1, wherein maintaining the interaction information comprises storing the interaction information at at least one of a client-side device, a server, and a proxy server.

21. The method of claim 1, wherein:
    monitoring user behavior while interacting with a first representation of digital content comprises monitoring a first user's behavior including highlighting a textual passage of content or selecting a portion of an image or document while interacting with the first representation; and deforming a second representation of digital content using the interaction information comprises deforming a second representation presented to a second user.

22. The method of claim 1, wherein deforming a second representation includes deforming an active area of the second representation corresponding to the first display interaction area and at least the second display interaction area of the first representation.

23. A method for presenting a representation of digital content, comprising:

monitoring user behavior while interacting with a first representation of digital content on a first device, wherein user behavior includes how often or how many times a first display interaction area and at least a second display interaction area are interacted with or in what order a user interacts with the first display interaction area and at least the second display interaction area;

determining interaction information from the user behavior, wherein the interaction information identifies the first display interaction area and at least the second display interaction area from the user interaction with the first representation of digital content and an order in which the first display interaction area and at least the second display interaction area of the first representation of digital content are selected;

maintaining the interaction information;

deforming a second representation of digital content on a second device using the interaction information, wherein deforming includes scaling a portion of at least one of the first display interaction area and the second display interaction area of the first representation of digital content based on the interaction information as the second representation, wherein the scaling scales only a portion of the first display interaction area and the second display interaction area relative to the first representation; and presenting the representation of digital content.

24. A method for presenting digital content, comprising:

presenting a first representation of digital content on a first device;

presenting a second representation of the digital content on a second device;

monitoring user interaction with at least one of the first representation and the second representation, wherein the user interaction includes identifying a first display interaction area and at least a second display interaction area from the user interaction with the first representation of digital content and a first display interaction area and at least a second display interaction area from the user interaction with the second representation of digital content;

determining interaction information from the user interaction, wherein the interaction information includes an identification of at least the first display interaction area and the second display interaction area of the first representation or the second representation and an order in which the first display interaction area and the second display interaction are of the first representation or the second representation are selected;

maintaining the interaction information;

deforming at least one of the first representation and the second representation of the digital content using the interaction information;

wherein said deforming step includes at least one of deforming the first representation using interaction information determined from interaction with the second representation and deforming the second representation using interaction information determined from interaction with the first representation, wherein deforming includes scaling text contained in at least one of the first display interaction area and the second display interaction area of the first representation of digital content based on the interaction information as the second representation, wherein the scaling scales only the text contained in the first display interaction area and the second display interaction area relative to the first representation; and presenting the digital content.

25. A method for presenting digital content, comprising:

identifying a first display interaction area and at least a second display interaction area of a representation of digital content determined to be of interest using observed user interaction which includes evaluating an order in which the first display interaction area and at least the second display interaction area of the representation of digital content are selected and how often or how many times the first display interaction area and at least the second display interaction area are selected;

accepting the interaction area and the user interaction as interaction information;

deforming the representation of the digital content using the interaction information, wherein deforming includes scaling at least one of the first display interaction area and the second display interaction area of the first representation of digital content based on the interaction information as the second representation, wherein the scaling scales one of the first display interaction area and the second display interaction area relative to the first representation; and presenting the digital content.

26. The method of claim 25, wherein the representation of the digital content is a second representation of the digital content, and wherein:

the interaction information is interaction information determined from interaction with a first representation of the digital content.

27. The method of claim 25, wherein the digital content is second digital content, and wherein:

the interaction information is interaction information determined from interaction with a representation of first digital content.

28. The method of claim 27, wherein the first digital content is a first web page and the second digital content is a second web page.

29. A method for determining interaction information, comprising:

monitoring user behavior while interacting with a first representation of digital content, wherein the user behavior includes how often or how many times a first display interaction area and at least a second display interaction area are interacted with and at least an order a user interacts with the first display interaction area and at least the second display interaction area;

determining interaction information from the user behavior, wherein the interaction information includes identifying the first display interaction area and at least the second display interaction area from the user behavior with the first representation of digital content and the order in which the first display interaction area and at least the second display interaction area of the first representation of digital content are selected, wherein deforming includes scaling one or more pixels selected in at least one of the first display interaction area and the second display interaction area of the first representation of digital content based on the interaction information as the second representation, wherein the scaling scales only the one or more pixels selected in the first display interaction area and the second display interaction area relative to the first representation; and maintaining the interaction information.

30. A method for distributing digital content, comprising:
accepting a request for digital content from a device;
retrieving the digital content;
retrieving interaction information, wherein the interaction information identifies a first display interaction area and at least a second display interaction area from the user interaction with the digital content and an order in which the first display interaction area and at least the second display interaction area of the digital content are selected;
modifying the digital content based on the interaction information, wherein deforming includes scaling two or more pixels selected in at least one of the first display interaction area and the second display interaction area of the first representation of digital content based on the interaction information as the second representation, wherein the scaling scales only the two or more pixels selected in the first display interaction area and the second display interaction area relative to the first representation; and
transferring the modified digital content to the device.

31. The method of claim 30, wherein a representation of the digital content is deformed in accordance with the interaction information when presented on the device.

32. The method of claim 30, wherein retrieving the digital content comprises:
retrieving a copy of the digital content.

33. A method for distributing digital content, comprising:
accepting a request for digital content from a device;
retrieving the digital content;
retrieving interaction information, wherein the interaction information identifies a first display interaction area and at least a second display interaction area from the user interaction with the digital content, wherein the interaction information identifies degrees of interaction with the first display interaction area and at least the second display interaction area and sequences of interaction with the first display interaction area and at least the second display interaction area of the digital content; and
transferring the interaction information and the digital content to the device;
wherein a representation of the digital content is deformed at the device using the interaction information, wherein the deforming includes scaling at least one of the first display interaction area and the second display interaction area of the first representation of digital content based on the interaction information as the second representation, wherein the scaling does not scale the entire first display interaction area relative to the first representation.

34. The method of claim 33, wherein transferring the interaction information and the digital content to the device comprises:
transferring a first file containing the interaction information and a second file containing the digital content.

35. The method of claim 33, wherein transferring the interaction information and the digital content to the device comprises:
adding the interaction information to a file including the digital content; transferring the file to the device.

36. The method of claim 35, wherein the digital content is not modified by adding the interaction information.

37. A computer readable medium, comprising:
a code segment including instructions to monitor user behavior while interacting with a first representation of digital content;
a code segment including instructions to determine interaction information from the user behavior, wherein the interaction information identifies a first display interaction area and at least a second display interaction area from the user interaction with the digital content, wherein the interaction information includes how often or how many times a first display interaction area and at least a second display interaction area are selected and an order in which the first display interaction area and at least the second display interaction area are selected;
a code segment including instructions to maintain the interaction information, wherein the instructions to maintain include logging and storing; and
a code segment including instructions to deform a second representation of digital content using the interaction information, wherein the deforming includes scaling at least one of the first display interaction area and the second display interaction area of the first representation of digital content based on the interaction information as the second representation, wherein the scaling scales the first display interaction area and the second display interaction area relative to the first representation.

38. A machine readable medium having instructions stored thereon that when executed by a processor cause a system to:
monitor user behavior while interacting with a first representation of digital content;
determine interaction information from the user behavior, wherein the interaction information identifies a first display interaction area and at least a second display interaction area from the user interaction with the first representation of digital content and an order in which the first display interaction area and at least the second display interaction area of the first representation of digital content are selected;
maintain the interaction information, wherein maintaining the interaction information, includes logging and storing; and
deform a second representation of digital content using the interaction information, wherein the deform includes scaling at least one of the first display interaction area and the second display interaction area of the first representation of digital content based on the interaction information as the second representation, wherein the scaling scales the first display interaction area and the second display interaction area relative to the first representation.

39. A system, comprising:
means for monitoring user behavior while interacting with a first representation of digital content;
means for determining interaction information from the user behavior, wherein the interaction information identifies a first display interaction area and at least a second display interaction area from the user interaction with the first representation of digital content and an order in which the first display interaction area and at least the second display interaction area of the first representation of digital content are selected;

means for maintaining the interaction information, wherein the means for maintaining include logging and storing; and means for deforming a second representation of digital content using the interaction information, wherein the deforming includes scaling the first display interaction area of the first representation of digital content based on the interaction information as the second representation, wherein the scaling scales the second display interaction area with the ratio of the scale of the first display interaction area in the second representation to the first diplay interaction area in the first representation.

* * * * *